United States Patent [19]

Ikeda et al.

[11] Patent Number: 4,683,406
[45] Date of Patent: Jul. 28, 1987

[54] JOINT ASSEMBLY MOVABLE LIKE A HUMAN ARM

[75] Inventors: Hiroki Ikeda; Nobuaki Takanashi, both of Tokyo, Japan

[73] Assignee: NEC Corporation, Japan

[21] Appl. No.: 742,711

[22] Filed: Jun. 7, 1985

[30] Foreign Application Priority Data

| | | |
|---|---|---|
| Jun. 8, 1984 [JP] | Japan | 59-117747 |
| Oct. 5, 1984 [JP] | Japan | 59-151070[U] |
| Oct. 11, 1984 [JP] | Japan | 59-212878 |
| Oct. 11, 1984 [JP] | Japan | 59-212879 |
| Oct. 11, 1984 [JP] | Japan | 59-212880 |
| Oct. 12, 1984 [JP] | Japan | 59-213874 |

[51] Int. Cl.⁴ .......................................... G05B 19/42
[52] U.S. Cl. ....................................... 318/568; 901/3; 901/15; 901/28; 901/38
[58] Field of Search ................. 318/568; 901/3, 4, 15, 901/23, 28, 32, 38

[56] References Cited

U.S. PATENT DOCUMENTS

| | | | |
|---|---|---|---|
| 4,581,566 | 4/1986 | Ekstrom et al. | 318/568 |
| 4,594,671 | 6/1986 | Suigimoto et al. | 318/568 X |
| 4,602,195 | 7/1986 | Eberle et al. | 318/568 |
| 4,603,284 | 7/1986 | Perzley | 318/568 |

Primary Examiner—Benjamin Dobeck
Attorney, Agent, or Firm—Ostrolenk, Faber, Gerb & Soffen

[57] ABSTRACT

In a joint assembly for moving a free end relative to a reference end like a human arm, first and second axle members have first and second axes associated with the reference and the free ends, respectively, and are coupled to each other by an axis end plane oblique to the first and the second axes. A coupling member, such as a universal joint, is coupled to the first and the second axle members and to the reference end. The first and the second axle members are rotated about the first and the second axes, respectively, to move the free end along a spherical surface, with the free end prohibited from being twisted. The oblique axis end plane may be provided by a pair of plate members or by a pair of shells. Alternatively, the axis end plane may be given by a stator and a rotor of a single motor. A motion of the free end is controlled by angles of rotation of the first and the second axle members.

1 Claim, 33 Drawing Figures

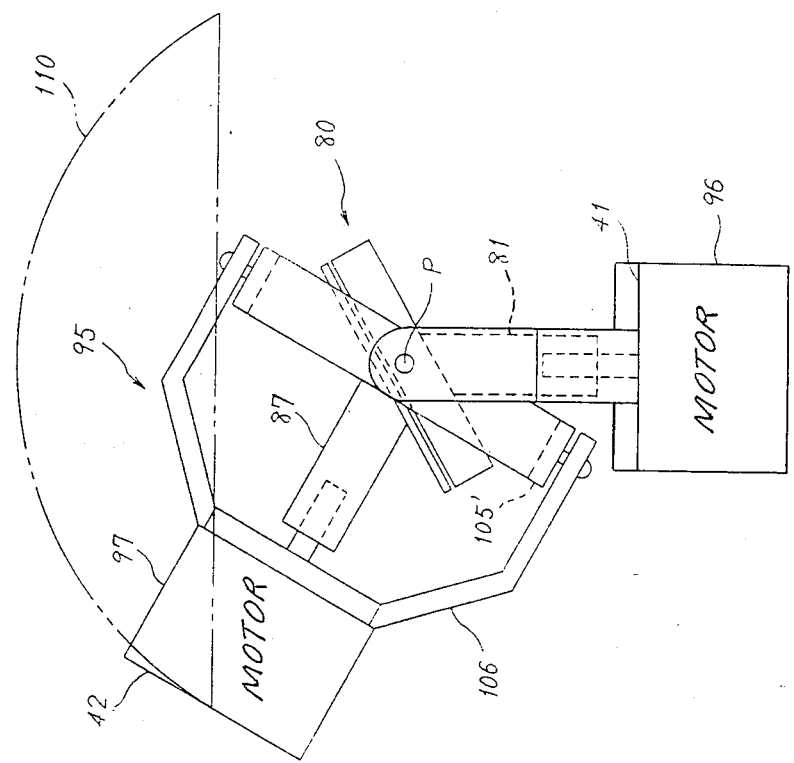
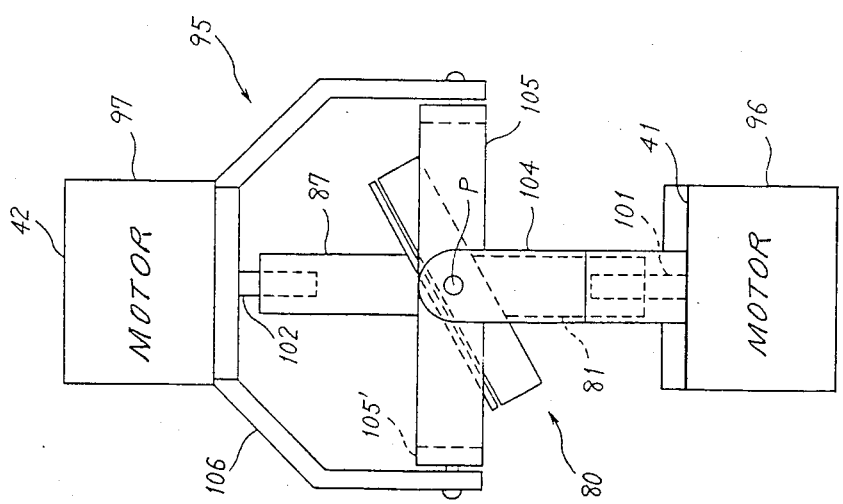

JOINT ASSEMBLY MOVABLE LIKE A HUMAN ARM

BACKGROUND OF THE INVENTION

This invention relates to a joint assembly for use in a robot mechanism.

In general, it is preferable that a robot mechanism is movable like a human arm which can be moved in various manners. Specifically, the human arm can move a human hand around an elbow along a spherical surface and can be swiveled with respect to the elbow, with an arm axis drawing a cone-shaped surface. As regards swiveling the human arm, it is to be noted that the human arm itself may never be rotated about the arm axis. In other words, the human arm can be swiveled with respect to the elbow with a rotation or twist of the human arm itself suppressed about the arm axis.

In order to simulate such a motion of the human arm, the robot mechanism should comprise an intricate and heavy joint assembly, as will later be described with reference to a few figures of the accompanying drawing. In addition, such an intricate joint assembly results in difficulty of control.

In a paper contributed by Shigeo Hirose et al to the Institute of Measurement and Automatic Control Engineers of Japan, Vol. 17, pages 686-692 (No. 6, September 1981), a so-called oblique swivel joint is proposed to form a joint model and comprises a first link member which has a first link axis, a first slant end oblique to the first link axis, a second link member which has a second link axis concurrent with the first link axis, and a second slant end guided along the first slant end. The second slant end is rotated along the first slant end about the second link axis by a motor fixed to the first slant end.

As will later be described with reference to the other figures of the accompanying drawing, the second link member can be swiveled along a cone-shaped surface drawn by the second link axis. However, it is to be noted that the second link member itself is inevitably automatically rotated about the second link axis by the motor. Therefore, the proposed joint assembly can never simulate the motion of the human arm.

SUMMARY OF THE INVENTION

It is an object of this invention to provide a joint assembly which can simulate a human forehand and which is simple in structure.

It is another object of this invention to provide a joint assembly which is light in weight.

It is still another object of this invention to provide a joint assembly which can readily be controlled.

According to this invention, a joint assembly is for use in joining a reference end to a free end to move the free end relative to the reference end. The joint assembly comprises a first axle member having a first axis, a first axis end rotatably supported on the reference end, and a second axis end defining an axis end plane oblique to the first axis at a predetermined angle, a second axle member having a second axis concurrent with the first axis, a third axis end rotatably guided along the axis end plane, and a fourth axis end adjacent to the free end, and coupling means for coupling the fourth axis end to the reference end and the free end to move the free end in cooperation with the first and the second axle members.

BRIEF DESCRIPTION OF THE DRAWING

FIG. 8 is a side view of the joint assembly which comprises the driving mechanism illustrated in FIGS. 6 and 7 and which retains a predetermined attitude;

FIG. 9 is a similar view for use in describing another attitude of the joint assembly illustrated in FIG. 8;

DESCRIPTION OF THE PREFERRED EMBODIMENTS

Figure 1:
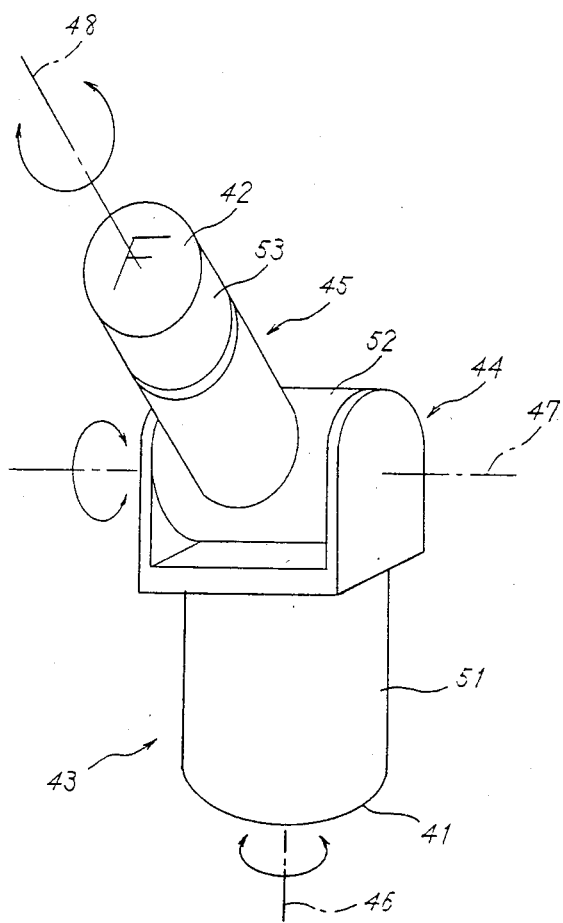
FIG. 1 is a perspective view of a conventional joint assembly.

Referring to FIG. 1, description will be made about a conventional joint assembly for a better understanding of this invention. The illustrated joint assembly is for use in simulating a human arm in a robot mechanism and joins a reference end 41 and a free end 42 movable relative to the reference end 41. A letter or mark "F" is drawn on the free end 42 for convenience of description.

The joint assembly comprises a first block 43, a second block 44 supported on the first block 43, and a third block 45 attached to the second block 44. The first block 43 has a first block axis 46 perpendicular to the reference end 41. The second block 44 has a second block axis 47 intersecting the first block axis 46. The third block 45 has a third block axis 48 transverse to the second block axis 47 and concurrent with the first block axis 46. The first through third blocks 43 to 45 comprise first through third motors 51 to 53 which can rotate about the first through third block axes 46 to 48, respectively. With this structure, the free end 42 is moved by rotation of the second motor 52 with a circular locus drawn by the free end 42 when the first and the third motors 51 and 53 are kept in inactive states.

Figure 2:
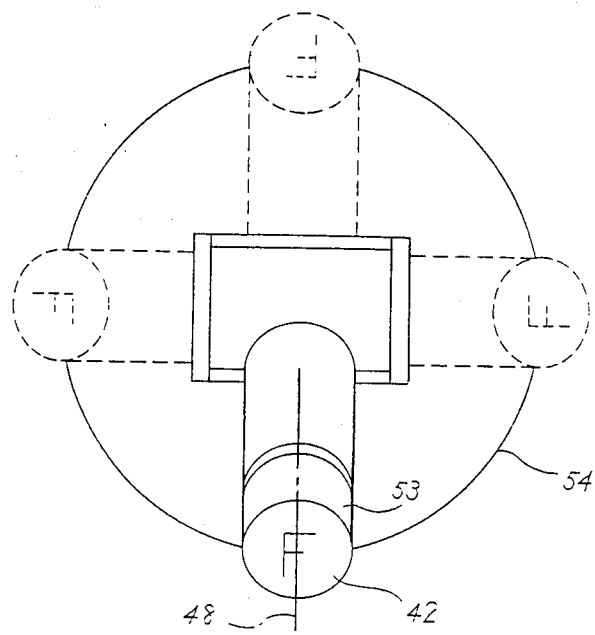
FIG. 2 is a top view for use in describing a motion of the conventional joint assembly illustrated in FIG. 1.

Referring to FIG. 2 together with FIG. 1, let the first motor 51 alone be rotated with the second and the third motors 52 and 53 kept in inactive states. In this event, the free end 42 is swiveled along a circular orbit 54 about the first block axis 46 in a manner illustrated in FIG. 2. More specifically, when the free end 42 is swiveled from a lowermost position depicted by a real line by 180° and placed at an uppermost position depicted by a broken line, the mark "F" at the uppermost position is upset or inverted relative to that at the lowermost position. This means that the free end 42 is twisted about the third block axis 48 when the first motor 51 alone is rotated about the first block axis 46.

Figure 3:
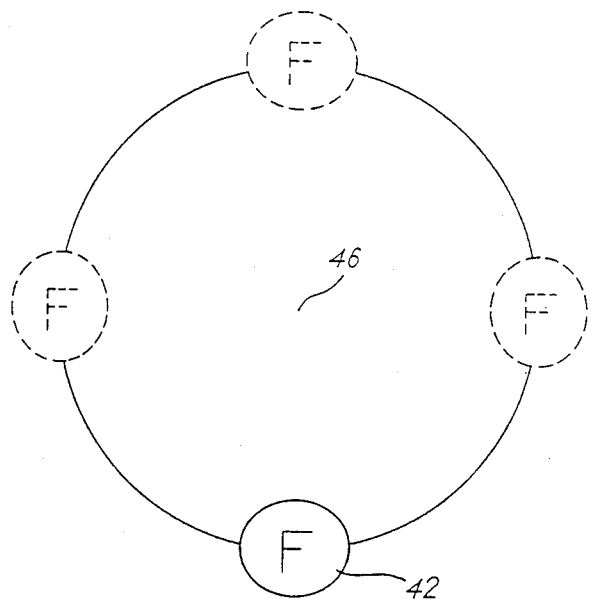
FIG. 3 is a similar view for use in describing a motion which is to be realized by this invention.

Referring to FIG. 3 together with FIGS. 1 and 2, a motion of the free end 42 will be described in consideration of a motion of a human arm and palm. The motion of the human arm and palm can be simulated by rotating the free end 42 about the third block axis 48 on circulating or swiveling the free end about the first block axis 46 in a manner illustrated in FIG. 3. For this purpose, the free end 42 should be rotated about the third block axis 48 by the third motor 53.

Thus, the first through third motors 51 to 53 must be included in the joint assembly so as to simulate the motion of the human arm and hand. Therefore, the illustrated joint assembly is intricate in structure and heavy in weight. Moreover, it is difficult to control three motors to carry out a desired motion.

Figure 4:
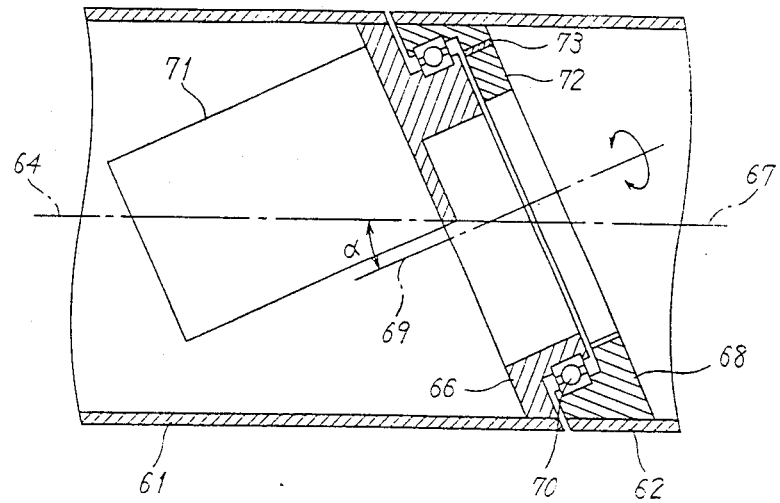
FIG. 4 is an axial sectional view of another conventional joint assembly.
Figure 5:
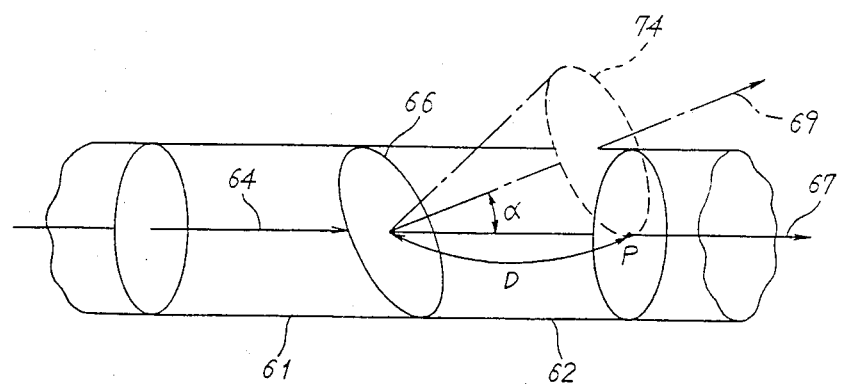
FIG. 5 a view for use in describing a motion of the joint assembly illustrated in FIG. 4.

Referring to FIGS. 4 and 5, another conventional joint assembly is equivalent to that described by S. Hirose et al in the paper referenced in the instant specification and is called an oblique swivel joint assembly by Hirose et al. The illustrated joint assembly comprises a first link member 61 and a second link member 62. The first link member 61 has a first link axis 64 and a first slant member 66 oblique to the first link axis 64. The first slant member 66 is fixed to an end of the first link member 61 to provide an axis end plane.

The second link member 62 has a second link axis 67 and a second slant member 68 which is fixed to an end of the second link axis 67 and which is oblique to the second link axis 67. The illustrated second link axis 67 is aligned with the first link axis 64. In addition, the second slant member 68 has a center axis 69 orthogonal to the end axis plane defined by the first link member 61.

The second slant member 68 is rotatably associated with the first slant member 66 by a bearing member 70. A motor 71 is fixed to the first slant member 66 and is engaged with the second slant member 68 via gears 72 and 73 formed around a driving axis of the motor 71 and around an internal surface of the second slant member 68, respectively. With this structure, the center axis 69 is parallel to the driving axis of the motor 71 and is oblique to the first link axis 64 at an angle of $\alpha$.

When the motor 71 is rotated about the driving axis thereof, the second link 62 is swung or swiveled along the first link member 61. For example, let a predetermined point P be selected on the second link axis 67 with a distance D left between the predetermined point P and the first slant member 66. As shown in FIG. 5, the predetermined point P draws a locus 74 depicted at a broken line during rotation of the motor 71.

It is to be noted that the second link member 62 itself is unavoidably rotated by the motor 71 about the second link axis 67 during swivel operation of the second link member 62 around the center axis 69. Therefore, the illustrated joint assembly can not simulate the motion of the human arm as illustrated in conjunction with FIG. 3.

Figure 6:
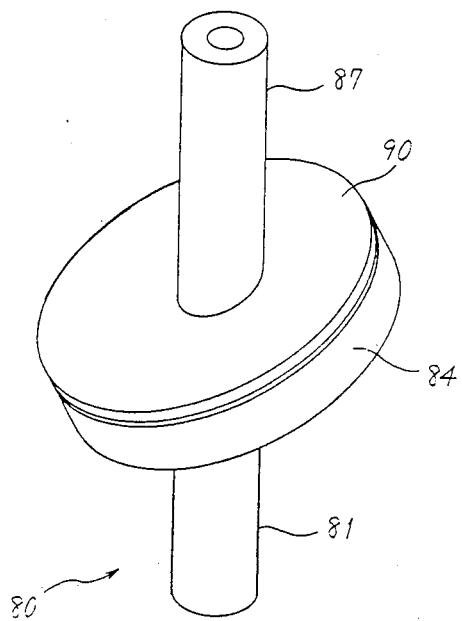
FIG. 6 is a perspective view of a driving mechanism for use in a joint assembly according to a first embodiment of this invention.
Figure 7:
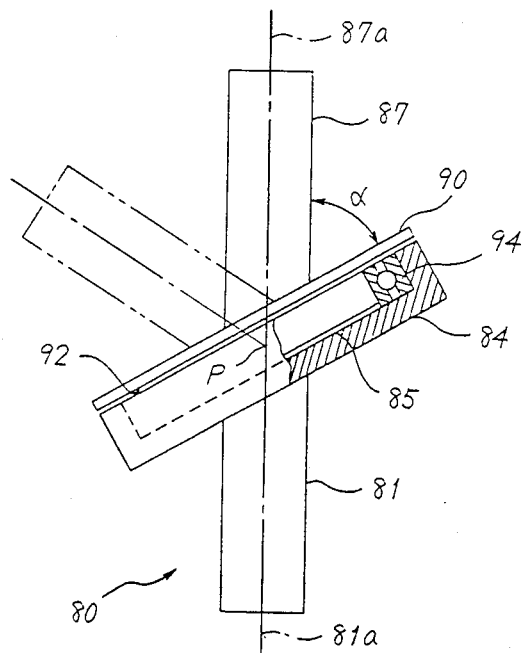
FIG. 7 shows a side view of the driving mechanism illustrated in FIG. 6, with the joint assembly partly cut away.

Referring to FIGS. 6 and 7, a joint assembly according to a first embodiment of this invention comprises a driving mechanism 80 which is operable as a part of the joint assembly. The illustrated driving mechanism 80 comprises a first axle 81 having a first axis 81a, a first axis end directed downwards of FIGS. 6 and 7, and a first slant axis end directed upwards thereof and oblique to the first axis 81a at a predetermined angle $\alpha$.

A first plate member 84 of a cup shape is fixed to the first slant axis end at a second axis end directed upwards of FIG. 7 to provide an axis end plane 85 at the second axis end. The axis end plane 85 is oblique or slant to the first axis 81a like the first slant axis end of the first axle 81. The first slant axis end may be called a first additional axis end.

A combination of the first axle 81 and the first plate member 84 will be referred to as a first axle member.

The driving mechanism 80 comprises a second axle 87 having a second axis 87a concurrent with the first axis 81a and a second slant axis end directed downwards of FIGS. 6 and 7. The second slant axis end may be called a second additional axis end and is oblique to the second axis 87a at an angle equal to the predetermined angle $\alpha$.

A second plate member 90 is fixed to the second slant axis end at a third axis end directed downwards of FIG. 7 to provide an additional axis end plane 92 at the third axis end. The second plate member 90 is rotatably jointed to the first plate member 84 by a bearing member 94. As a result, the additional axis end surface of the second plate member 90 is kept in parallel to the axis end surface of the first plate member 84 and is rotatable about the second axis on the axis end plane.

As shown in FIGS. 6 and 7, the second axle 87 has a fourth axis end which is opposite to the second additional axis end and which is directed upwards of FIGS. 6 and 7.

In FIGS. 6 and 7, a combination of the second axle and the second plate member 90 will be named a second axle member. In addition, the bearing member 94 may be referred to as a joining member for joining the second plate member 90 to the first plate member 84 and considered as a part of the second axle member.

As best shown in FIG. 7, each of the first and the second plate members 84 and 90 is oblique to the first and the second axes 81a and 87a at the predetermined angle α. The first axis 81a intersects the second axis 87a at a crosspoint P.

With this structure, a crossed axis angle between the first and the second axes 81a and 87a is variable by rotation of the first axis 81a. An azimuth of the second axis 87a can be altered on the end axis plane of the first plate member 84 by rotation of the second axis 87a.

Referring to FIGS. 8 and 9, the driving mechanism 80 illustrated in FIGS. 6 and 7 is coupled to a joint member 95 to form the joint assembly according to the first embodiment of this invention. The illustrated joint member 95 is a universal joint. In FIGS. 8 and 9, the joint assembly is for joining the reference end 41 to the free end 42 to move the free end 42 relative to the reference end 41, like in FIG. 1. It is noted here that only two motors are used in the joint assembly illustrated in FIGS. 8 and 9 and will be called first and second motors 96 and 97 which define the reference and the free ends 41 and 42, respectively.

More specifically, the first motor 96 comprises a motor housihg or frame and a rotor housed in the motor frame. The reference end 41 is defined on an upper surface of the motor frame. A first output shaft 101 is projected from the rotor outside of the motor housing. Likewise, the second motor 97 comprises a motor housing defining the free end 42 on an upper surface of the motor housing and a second output shaft 102 projected from a rotor housed in the motor housing downwards of FIGS. 8 and 9.

The first output shaft 101 is coupled to the first axis end of the first axle 81 to rotate the first axle 81 while the second output shaft 102 is coupled to the fourth axis end of the second axle 87 to rotate the second axle 87.

In FIGS. 8 and 9, the joint member, namely, universal joint 95 comprises a pair of rods 104 one of which is illustrated in FIGS. 8 and 9 and which stand on the reference end 41 with a gap left therebetween. A couple of parallel bars 105 is pivotally coupled to the rods 104 and is connected to a pair of side bars 105' (not shown) at both ends of each bar 105. Anyway, the parallel bars 105 and the side bars 105' surround a space therein and can pivot about the rods 104. The driving mechanism 80 is placed in the space.

A frame member 106 has a pair of arms coupled to center portions of the side bars and a support portion connected between the arms. The second motor 97 is fixed to the support portion. The second output shaft 102 is extended through the support portion towards the second axle 87. The illustrated joint member 95 is also movable back and forth of FIGS. 8 and 9 about the center portions of the side bars.

It is assumed that the bars 105 are supported by the rods 104 and a pair of support points coincident with the crosspoint P (FIG. 7) between the first and the second axes 81a and 87a and that the first and the second output shafts 101 and 102 are rotated about the first and the second axes 81a and 87a (FIG. 7), respectively. In this event, a coordinate axis which passes through the crosspoint P can be defined between the support points and will be called an x-axis. With this structure, the free end 42 is moved about the crosspoint P along a spherical surface 110 (FIG. 9) which has a radius determined by the second axle 87 and the second motor 97. A movable range of the free end 42 is dependent on the predetermined angle α and the joint member 95. For convenience of description, the joint assembly is assumed to be placed at a reference position in FIG. 8. In this event, the bars 105 are held horizontal. Another coordinate axis can be defined between the center portions of the side bars and will be called a y-axis when the bars 105 are placed at the reference position.

The free end 42 is movable on the spherical surface at a speed determined by speeds of rotation of the first and the second motors 96 and 97, drawing an orbit defined by the angles of rotation of the first and the second axes 81a and 87a. It is mentioned here that the free end 42 is moved in the manner illustrated in FIG. 3 without any twist of the free end 42 despite that the second axle 87 is rotated about the second axis 87a. This is because the joint member, namely, universal joint 95 is coupled to the driving mechanism 80. Accordingly, the illustrated joint assembly can effectively simulate a motion of a human arm.

In order to analyze the motion of the free end 42, attention will be directed only to a center point of the free end 42.

Figure 10:
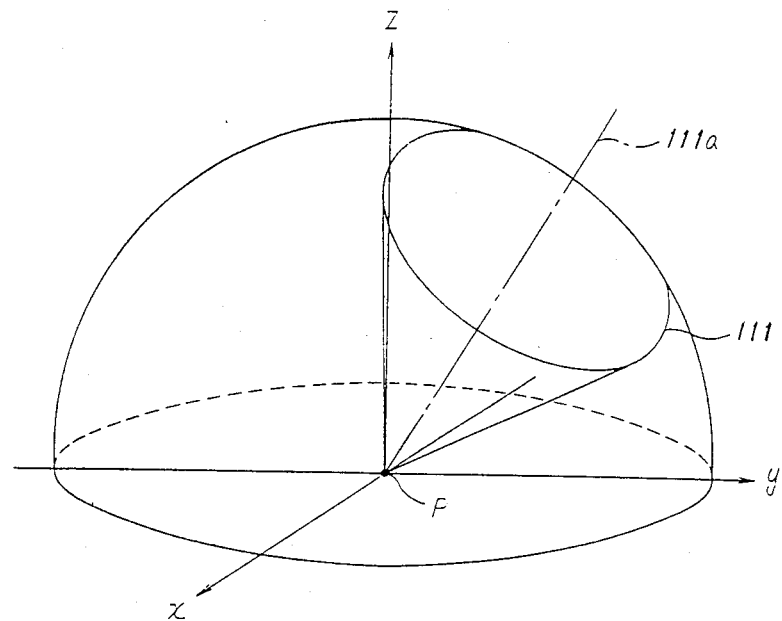
FIG. 10 is a view for use in describing a motion of the joint assembly illustrated in FIGS. 8 and 9.

Referring to FIG. 10, an orthogonal coordinate of a three-dimension is illustrated which has an origin placed at the crosspoint P between the first and the second axes 81a and 87a, a z-axis directed along the first axis 81a, an x-axis defined between the support points in the manner described in conjunction with FIGS. 8 and 9, and a y-axis determined in the manner mentioned before.

At first, let the second axis 87a be coincident with the z-axis and therefore aligned with the first axis 81a, as suggested in FIG. 8. Under the circumstances, it is assumed that the first axle 81 alone is rotated about the first axis 81a (FIG. 7). It is readily understood that the center point of the free end 42 draws a first circular locus 111 as illustrated in FIG. 10. A locus center axis 111a is defined between the origin P and a locus center point of the first circular locus 111 and intersects the z-axis at an angle determined by the crossed axis angle between the first and the second axes 81a and 87a.

Figure 11:
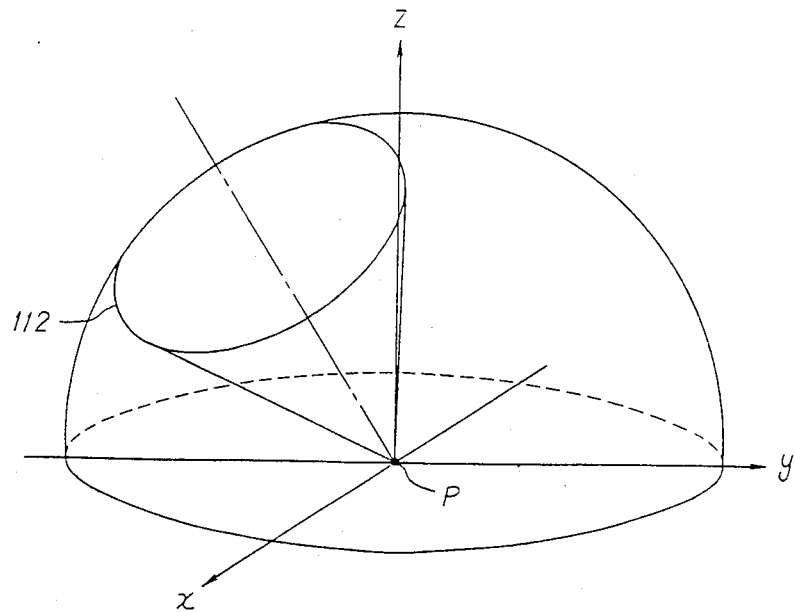
FIG. 11 is a view for use in describing another motion of the joint assembly illustrated in FIGS. 8 and 9.

Referring to FIG. 11, it is assumed that the second axle 87 alone is rotated about the second axis 87a with the first axle 81 kept unrotated about the first axis 81a. The center point of the free end draws a second circular locus 112 as illustrated in FIG. 11. The second circular locus 112 is symmetrical with the first circular locus 111 (FIG. 10) with respect to an x-z plane, as readily understood.

Figure 12:
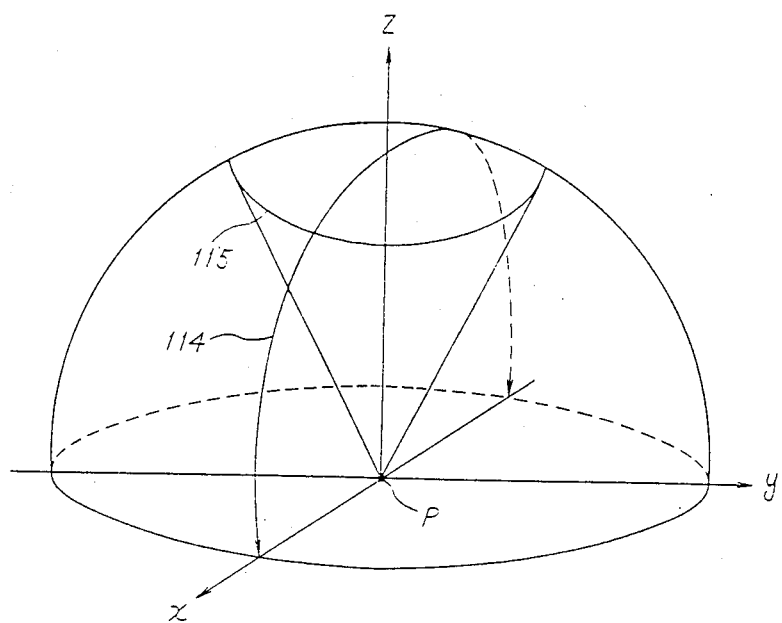
FIG. 12 is a view for use in describing operation resulting from the motions illustrated in FIGS. 10 and 11.

Referring to FIG. 12, consideration will be directed to the case where both of the first and the second axles 81 and 87 are rotated about the first and the second axes 81a and 87a, respectively. Briefly, it is possible to know orbits by combining the first and the second circular loci 111 and 112 as shown in FIGS. 10 and 11.

Let the first and the second axles 81 and 87 be rotated in reverse directions to each other at the same speed of rotation. In this event, the center point of the free end draws an arcuate one 114 of the orbits that appears along the x-axis.

On the other hand, when the first and the second axles 81 and 87 are rotated in the same direction at the same speed of rotation, the center point of the free end moves about the z-axis along a circular one 115 of the orbits.

The orbits of the free end can be varied by changing or selecting the speeds of rotation of the first and the second axles 81 and 87. Thus, the joint assembly illustrated in FIGS. 8 and 9 realizes various motions of the free end like a human arm. Each motion of the free end can be controlled in a manner to be described later.

Figure 13:
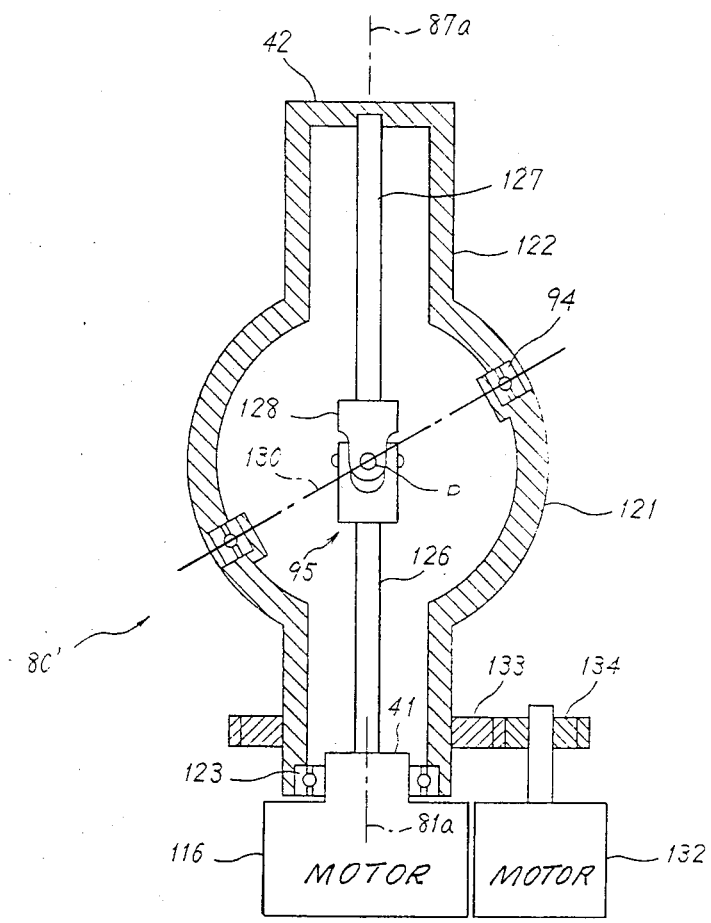
FIG. 13 is a partial sectional view of a joint assembly according to a second embodiment of this invention.

Referring to FIG. 13, a joint assembly according to a second embodiment of this invention comprises similar parts designated by like reference numerals. The illustrated joint assembly comprises a driving mechanism 80' of a barrel type which is operable in a manner similar to the driving mechanism illustrated in FIGS. 8 and 9. The driving mechanism 80' of the barrel type is divided into the first and the second axle members which are operatively coupled to the reference end 41 and the free end 42 as described in conjunction with FIGS. 8 and 9. The reference end 41 is defined by an upper surface of a first driving motor 116 which has a protrusion at a central portion thereof, as shown in FIG. 13.

The first and the second axle members comprise first and second shells 121 and 122 operable in manners similar to the first and the second axles 81 and 87, respectively. More specifically, the first shell 121 surrounds the first axis 81a and has a first tubular portion and a first hemispherical segment connected to the first tubular portion. The first tubular portion defines a first axis end which is coupled to the protrusion of the first driving motor 116 by an additional bearing member 123 to rotate the first shell 121 about the first axis 81a. On the other hand, the first hemispherical segment provides the second axis end which is oblique to the first axis and which defines the axis end plane depicted at 130. The second axis end is circular in shape.

The second shell 122 surrounds the second axis 87a and defines an inner space in combination with the first shell 121. The second shell 122 comprises a second hemispherical segment resting on the first shell 121 and a second tubular portion supported on the second hemispherical segment. The second hemispherical segment has the third axis end which is directed downwards of FIG. 13 and which is circular in shape. The third axis end is oblique to the second axis 87a and rotatably guided by the bearing member 94 along the second axis end of the first shell 121, like in FIG. 7. As mentioned before, the bearing member 94 may be regarded as a part of the second axle member. The axis end plane 130 passes through a center of the bearing member 94 as illustrated in FIG. 13.

The second tubular portion is closed at an extremity thereof to provide the fourth axis end of the second axle member. Thus, the inner space is closed at the fourth end. As shown in FIG. 13, the free end 42 is defined on the extremity in the illustrated joint assembly.

The joint member 95 is placed within the inner space. Specifically, the illustrated joint member 95 comprises a first transmission shaft 126 coupled to the first output shaft 101 (FIG. 8) of the first driving motor 116, a second transmission shaft 127 fixed to the extremity of the second tubular portion, and a universal joint 128 for jointing the first and the second transmission shafts 126 and 127 at a coupling point which may be equivalent to the crosspoint P (FIGS. 8 and 9) and which is therefore indicated at P. The crosspoint P is placed on the axis end plane 130.

In FIG. 13, the first shell 121 is externally coupled to an output shaft of a second driving motor 132 through first and second gears 133 and 134 which are engaged with each other and which are fixed to the first shell 121 and the output shaft of the second driving motor 132, respectively.

With this structure, the first driving motor 116 serves to rotate the first transmission shaft 126 of the joint member 95 while the second driving motor 132 serves to rotate the first shell 121. Therefore, the first and the second driving motors 116 and 132 are similar to the second and the first motors 97 and 96 illustrated in FIGS. 8 and 9, respectively. Inasmuch as no motor is supported on the joint assembly, no extra load is imposed on the first driving motor 116. Therefore, it is possible to lighten a load given to the first driving motor 116 and to render the load equal to a load imposed on the second driving motor 132.

Figure 14:
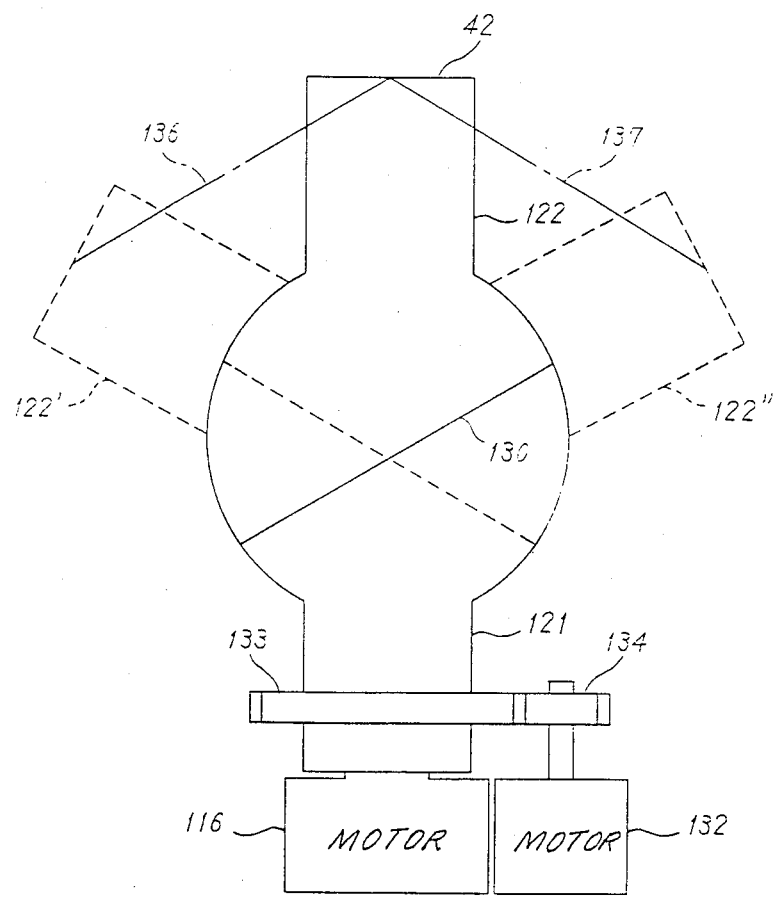
FIG. 14 is a side view for use in describing operation of the joint assembly illustrated in FIG., 13.

Referring to FIG. 14, description will be made about a motion of the free end 42 carried out when the first and the second driving motors 116 and 132 are rotated about the output shaft thereof. At first, let the first driving motor 116 alone be driven with the second driving motor 132 deenergized. In this event, the first transmission shaft 126, the universal joint 128, and the second transmission shaft 127 are rotated about the first axis 81a. Consequently, the second shell 122 is moved along the axis end plane and the center point of the free end 42 draws a first locus 136 as shown in FIG. 14 by a dot-and-dash line. Anyway, the second shell 122 is moved between an upright position shown at a real line in FIG. 14 and a leftmost position shown at a broken line 122'.

On the other hand, let the second driving motor 132 alone be rotated with the first driving motor 116 kept inactive. In this case, the first shell 121 is rotated through the first and the second gears 133 and 134 to make the center point of the free end 42 draw a second locus 137 as illustrated at another dot-and-dash line. As a result, the second shell 122 is moved between the upright position and a rightmost position shown at 122". On rotation of the first shell 121, the axis end plane 130 is changed from a first oblique position depicted at a real line to a second oblique position depicted at a broken line.

As readily understood from the above, the free end 42 is movable like that illustrated with reference to FIGS. 8 and 9 and therefore draws loci similar to those described in conjunction with FIGS. 10, 11, and 12. It is to be noted in FIGS. 13 and 14 that the free end 42 itself is also not rotated or twisted about the second axis 87a. Accordingly, the free end 42 is movable like a human arm in the illustrated joint assembly.

Figure 15:
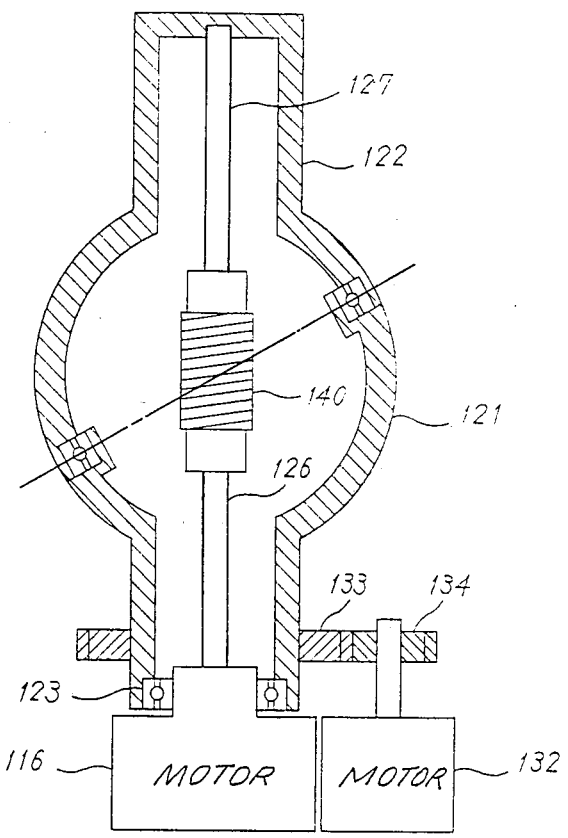
FIG. 15 is a partial sectional view of a joint assembly according to a third embodiment of this invention.

Referring to FIG. 15, a joint assembly according to a third embodiment of this invention is similar to that illustrated in FIG. 13 except that a flexible joint 140 is used in place of the universal joint 128 to couple the first and the second transmission shafts 126 and 127. The flexible joint 140 enables transmission of a rotation and is bendable or flexible, as known in the art. For example, the flexible joint 140 may comprise a spring or the like.

It is possible to carry out operation in a manner similar to that illustrated in conjunction with FIGS. 13 and 14.

Figure 16:
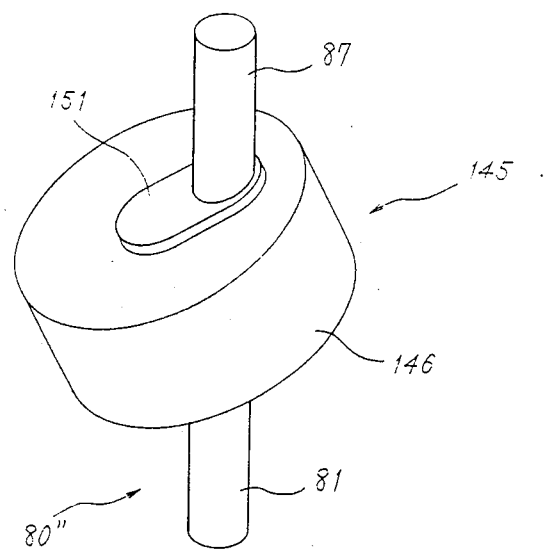
FIG. 16 is a perspective view of a driving mechanism for use in a joint assembly according to a fourth embodiment of this invention.
Figure 17:
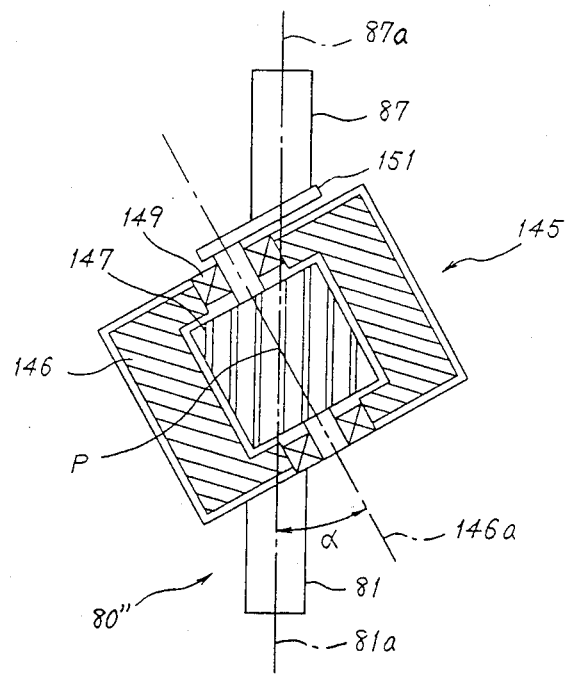
FIG. 17 is a partial sectional view of the driving mechanism illustrated in FIG. 16.

Referring to FIGS. 16 and 17, a joint assembly according to a fourth embodiment of this invention comprises a driving mechanism 80″. The illustrated driving mechanism 80″ comprises first and second axles 81 and 87 having first and second axes 81a and 87a, respectively, like that illustrated in FIGS. 6 and 7. The first axis 81a is concurrent with the second axis 87a at the crossed axis point P (FIG. 17).

Like in FIGS. 6 and 7, the first axle 81 has the first axis end directed downwards of FIGS. 16 and 17 and the first slant axis end opposite to the first axis end and directed upwards. Likewise, the second axle 87 has the second slant axis end and the fourth axis end which are directed downwards and upwards of FIGS. 16 and 17, respectively. The first and the second slant axis ends are oblique to the first and the second axes at the same angle.

In the example being illustrated, a motor 145 is interposed between the first and the second slant axis ends to define the second and the third axis ends and the axis end plane oblique to the first axis 81a. More particularly, the motor 145 comprises a stator housing 146 having a stator center axis 146a and a rotor 147 housed in the stator housing 146. The rotor 147 has a rotor shaft rotatably coupled to the stator housing 146 by a bearing element 149 and a rotor axis defined by the rotor shaft. Various kinds of known gears, such as a reducing gear, may be used as the bearing element 149. The rotor axis is coincident with the stator center axis 146a and will therefore be called a motor axis hereinunder and indicated at 146a.

A coupling arm 151 is connected between the second slant axis end and the rotor axis so that the first axis 81a always meets the second axis 87a at the crossed axis point P and also always meets the motor axis 146a at the crossed axis point P. With this structure, the motor axis 146a always intersects each of the first and the second axes 81a and 87a at a predetermined angle α determined by each oblique angle of the first and the second slant axis ends.

At any rate, the first and the second axes 81a and 87a are always crossed with each other at the crossed axis point P even when they are aligned with each other, as illustrated in FIG. 17.

In the example being illustrated, the stator housing 146 serves as a part of the first axle member and gives the second axis end at an upper end thereof. Likewise, the rotor 147 serves as a part of the second axle member and gives the third axis end at a lower end thereof. The second axis end and the third axis end are juxtaposed to the first and the second slant axis ends.

It is possible to define a plane passing through the crossed axis point P in parallel to the first slant axis end, as illustrated at a real line. The plane is determined by the first slant axis end and will be called the axis end plane. Thus, the first axle member serves to define the axis end plane.

Figure 20:
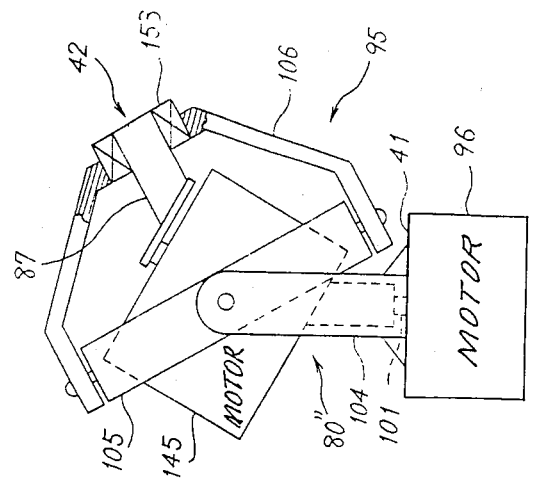
FIG. 20 is a similar view for use in describing a further attitude of the joint assembly illustrated in FIG. 18.
Figure 19:
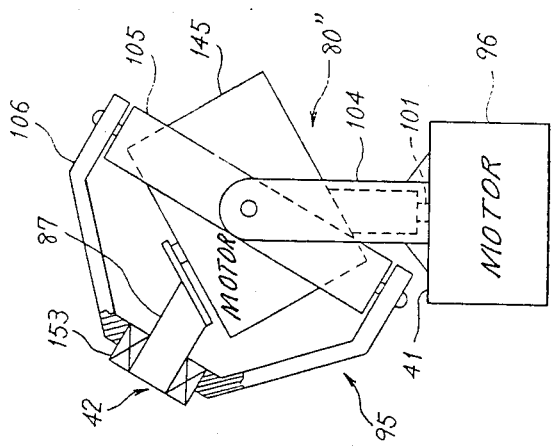
FIG. 19 is a similar view for use in describing another attitude of the joint assembly illustrated in FIG. 18.
Figure 18:
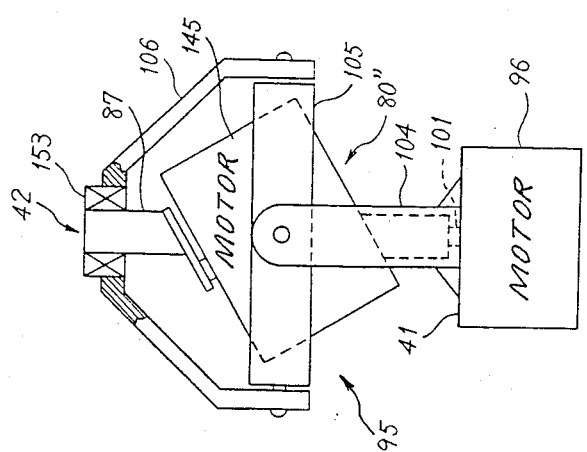
FIG. 18 shows a side view of the joint assembly which comprises the driving mechanism illustrated in FIGS. 16 and 17 and which is put in a predetermined attitude, with the joint assembly partially cut away.

Referring to FIGS. 18 through 20, description will proceed to a joint assembly comprising the driving mechanism 80″ illustrated with reference to FIGS. 16 and 17 and a joint member 95 which may be a universal joint as illustrated in conjunction with FIGS. 8 and 9. The driving mechanism 80″ illustrated in FIGS. 16 and 17 is coupled to the reference end 41 given by an upper surface of a motor which may be identical with the first motor 96 illustrated in FIGS. 8 and 9 and which will be indicated at 96. Specifically, the first axis end of the first axle 81 is fixed to an output shaft 101 of the motor 96 in a manner similar to that illustrated in FIGS. 8 and 9.

The joint member 95, namely, universal joint is similar in structure and operation to that illustrated in FIGS. 8 and 9 and therefore comprises the rods 104 standing on both sides of the driving mechanism 80″, the parallel bars 105 coupled to the rods 104 at support points coincident or concurrent with the crossed axis point P of the driving mechanism 80″, and the side bars (not shown) connected to both ends of each of the bars 105. The support points provide a first pivot axis orthogonal to the sheet of FIG. 18. The side bars define a second pivot axis passing through the center portions thereof and perpendicular to the first pivot axis. A frame member 106 is coupled to the second pivot axis in the manner illustrated in FIGS. 8 and 9.

The illustrated frame member 106 comprises a pair of the arms extended from both sides of the second pivot axis and the support portion or a top portion between both of the arms, as described in FIGS. 8 and 9. The fourth axis end of the second axle 87 is rotatably supported on the support portion of the frame member 106 by the use of a bearing 153. An upper surface of the support portion and the fourth axis end provide the free end in the example being illustrated.

With this structure, the free end 41 is moved leftwards as illustrated in FIG. 19 when the motor 145 is rotated in a situation illustrated in FIG. 18. On the other hand, the rotation of the motor 96 results in a rightward movement, as shown in FIG. 20. Such a leftward or rightward movement is similar to that illustrated in FIGS. 10 through 12 and will therefore not be described any longer.

It is to be noted here that the free end 42 is not twisted even when the second axle 87 is rotated by the motor 145 but is swiveled in the manner illustrated in FIG. 3. This is because the twist or rotation of the free end 42 is suppressed by the joint member, namely, universal joint 95. Therefore, the illustrated joint assembly can simulate a human arm, like the joint assemblies according to the first and the second embodiments.

Figure 21:
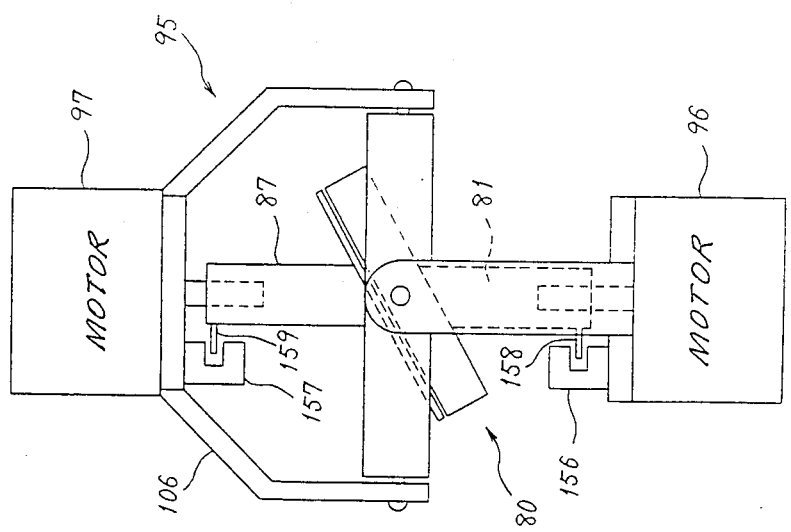
FIG. 21 is a side view of a joint assembly according to a fifth embodiment of this invention.

Referring to FIG. 21, a joint assembly according to a fifth embodiment of this invention is similar in structure and operation to that illustrated in conjunction with FIGS. 8 and 9 except that a reference attitude can be detected in the joint assembly shown in FIG. 21. On repeating operation, it becomes important to detect whether or not the joint assembly is restored to the reference attitude.

In order to detect the reference attitude, first and second photo interrupters 156 and 157 are adjacent to the first and the second axles 81 and 87 and are fixed to the frame of the first motor 96 and the frame member 106 of the joint member 95, respectively. The first and the second photo interrupters 156 and 157 are therefore not moved relative to the first and the second axles 81 and 87, respectively.

In the example being illustrated, first and second projections 158 and 159 are radially projected from the first and the second axles 81 and 87 towards the first and the second photo interrupters 156 and 157, respectively. The first and the second photo interrupters 156 and 157 are turned off only when the first and the second photo interrupters 156 and 157 are intercepted by the first and the second projections 158 and 159, respectively. In other words, each photo interrupter is turned on as long as it is not intercepted by each projection. Thus, a combination of the photo interrupter and the projection may be referred to as a detector for detecting the reference attitude of the joint assembly.

In FIG. 21, the first and the second projections 158 and 159 are entered in the first and the second photo interrupters 156 and 157, respectively. As a result, the first and the second photo interrupters 156 and 157 are intercepted by the first and the second projections 158 and 159 and are put in off-states, respectively. This means that the illustrated joint assembly retains the reference attitude.

When the first and the second axes 81 and 87 are rotated relative to the frames of the first and the second motors 96 and 97, respectively, the first and the second photo interrupters 156 and 157 are put into on-states, respectively. Thereafter, the reference attitude can be detected each time when the photo interrupters 156 and 157 are turned off.

Figure 22:
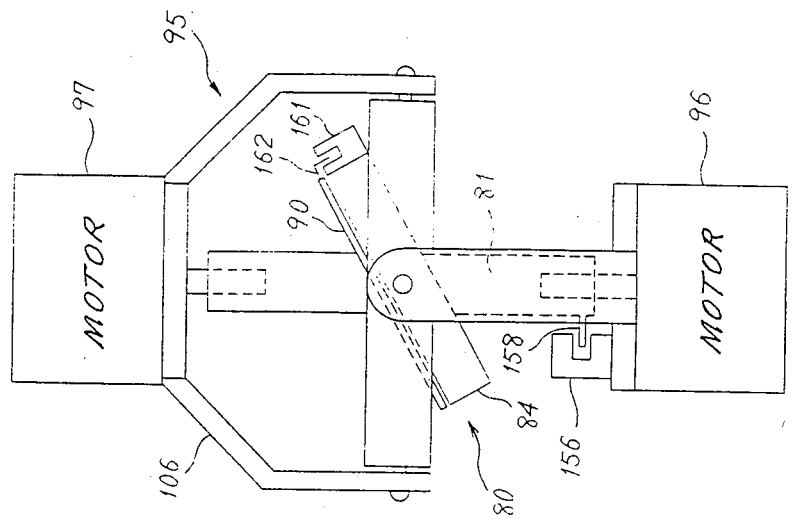
FIG. 22 is a similar view of a joint assembly according to a sixth embodiment of this invention.

Referring to FIG. 22, a joint assembly according to a sixth embodiment of this invention is similar to that illustrated in FIG. 21 except that an additional photo interrupter 161 and an additional projection 162 are attached to the first and the second plate members 84 and 90, respectively, in place of the second photo interrupter 157 and the second projection 159 illustrated in FIG. 21.

With this structure, the illustrated joint assembly retains the reference attitude when the additional photo interrupter 161 is intercepted by the additional projection 162, like in FIG. 21. Therefore, the reference attitude can be detected each time when the additional photo interrupter 161 is turned off by the additional projection 162.

In FIGS. 21 and 22, a microswitch, a contactless switch, or the like may be substituted for each of the first, the second, and the additional photo interrupters 156, 157, and 161. A detector, such as a rotary encoder, may be attached to each of the first and the second motors 96 and 97 instead of a combination of the photo interrupter and the projection.

From this fact, it is readily understood that the detectors may be attached to the joint assemblies illustrated in conjunction with FIGS. 13, 15, and 16.

Figure 23:
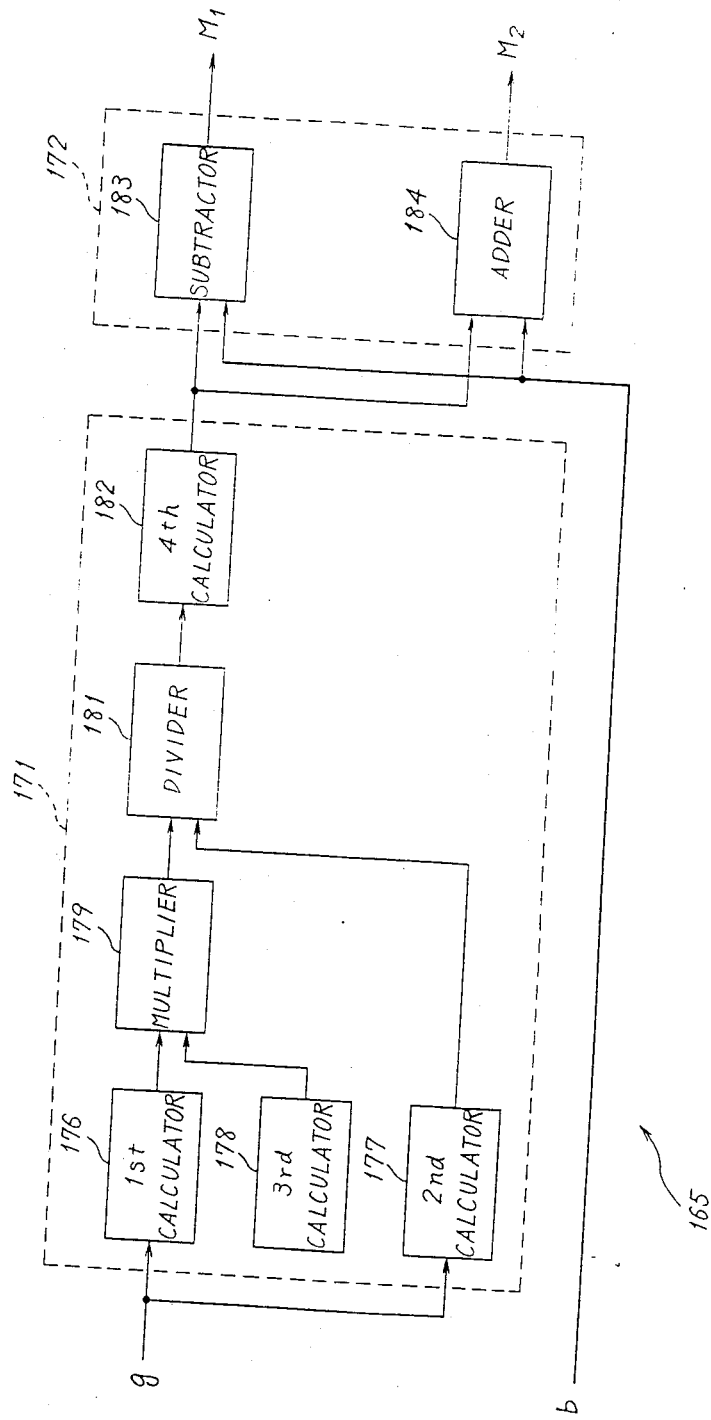
FIG. 23 is a block diagram of a control circuit for use in combination with each of the joint assembly to form a joint system according to a seventh embodiment of this invention.

Referring to FIG. 23, a joint system according to a seventh embodiment of this invention comprises a control circuit 165 as illustrated in FIG. 23 in combination with either one of the joint assemblies according to the first through sixth embodiments. Prior to description of the control circuit 165, the motion of the free end 42 will be analyzed in detail for a better understanding of the control circuit 165. Inasmuch as the motion of the free end 42 is common to all of the embodiments, description will be restricted to that joint assembly according to the first embodiment which is illustrated in FIGS. 8 and 9 and which has the orthogonal coordinate system of x-y-z determined in the manner mentioned in conjunction with FIGS. 10 to 12.

Figure 24:
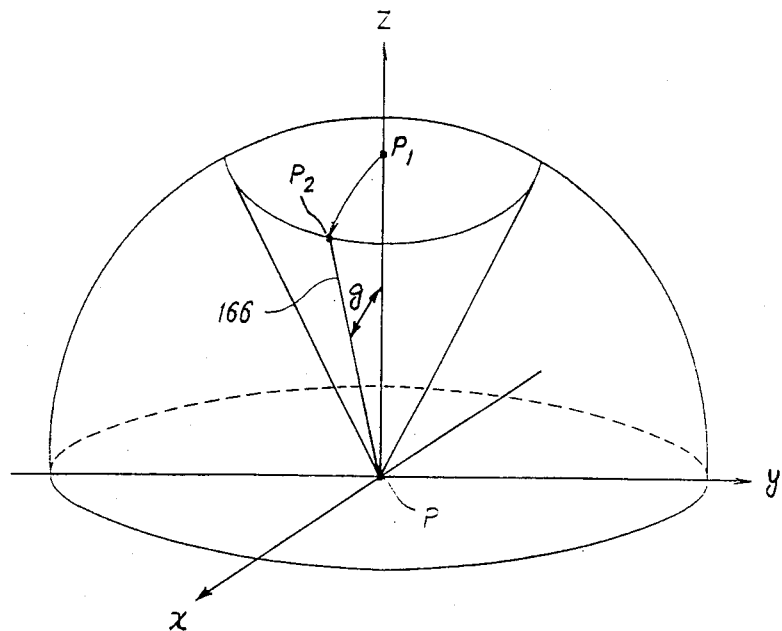
FIG. 24 is a view for use in describing a specific motion of each joint assembly.

Referring to FIG. 24, it is assumed that the center point of the free end 42 is positioned on the z-axis and will be referred to as a first point $P_1$. Subsequently, the center point of the free end is assumed to be moved from the first point $P_1$ to a second point $P_2$ along the x-z plane. The second point $P_2$ is specified by a line segment 166 between the center point and the origin P determined in the manner described with reference to FIG. 10. The line segment 166 intersects the z-axis at an angle g which will be called the crossed axis angle between the first and the second axes 81 and 87. In addition, an azimuth can be determined with respect to the x-z plane. As to the second point $P_2$, the azimuth is equal to 0°.

It should be recollected that the center point of the free end can be moved on the x-z plane when the first and the second axes 81 and 87 are rotated in the reverse directions to each other at the same speed of rotation, as mentioned with reference to FIG. 12. This means that the motion from the first point $P_1$ to the second point $P_2$ is decomposed into two componental motions which are individually imparted by a rotation of the first axle 81 alone and by a rotation of the second axle 87 alone, as specified by 111 and 112 in FIGS. 10 and 11, respectively.

Figure 25:
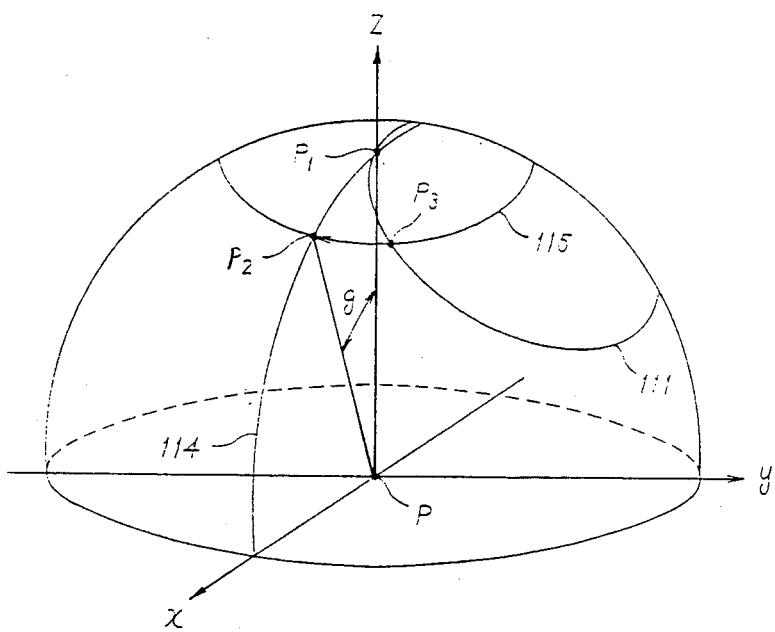
FIG. 25 is a similar view for use in analyzing the specific motion illustrated in FIG. 24.

Referring to FIG. 25, the motion from the first point $P_1$ to the second point $P_2$ will be decomposed so as to facilitate this invention. At first, let the first axle 81 alone be rotated counterclockwise. In this event, the center point of the free end is circulated from the first point $P_1$ by a prescribed angle $\phi$ along the first circular locus 111 and is assumed to reach a third point $P_3$.

Subsequently, the second axle 87 alone is rotated clockwise by the same prescribed angle $\phi$. The angle $\phi$ may therefore be called a common angle. In this case, the center point of the free end is moved along the circular orbit 115 illustrated in FIG. 12 from the third point $P_3$ to a point which is placed on the arcuate orbit 114 and which is identical with the second point $P_2$.

From this fact, it is readily understood that an angle of rotation between the third and the second points $P_3$ and $P_2$ specifies those angles of rotation of the first and the second axles 81 and 87 which are necessary for the motion from the first point $P_1$ to the second point $P_2$. The angles of rotation of the first and the second axles 81 and 87 will be named first and second angles $M_1$ and $M_2$ of rotation hereinunder, respectively.

Figure 26:
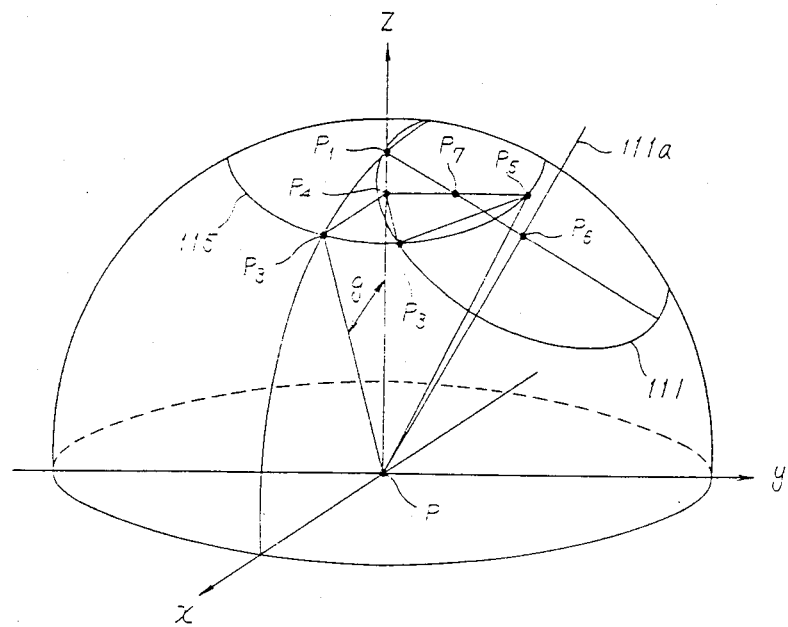
FIG. 26 is a similar view for use in further analyzing the specific motion.
Figure 27:
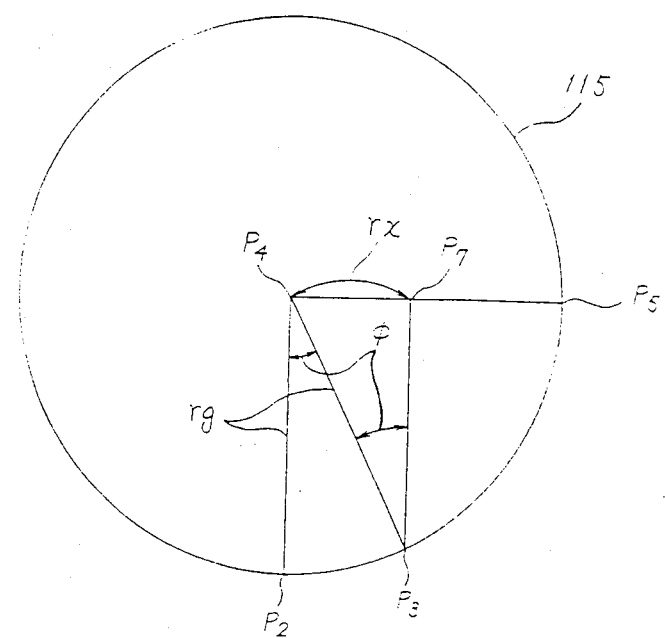
FIG. 27 is a view for use in describing a part of FIG. 26.
Figure 28:
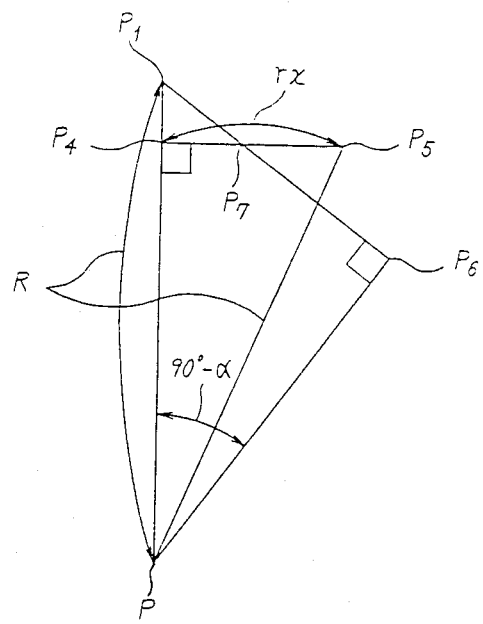
FIG. 28 is a view for use in describing another part of FIG. 27.

Referring to FIGS. 26 through 28, description will be directed to a relationship between a position of the center point of the free axis and the first and the second angles $M_1$ and $M_2$ of rotation. In FIG. 26, a fourth point $P_4$ is defined by drawing a perpendicular from the second point $P_2$ to the z-axis while a fifth point $P_5$ is a point of intersection between the circular orbit 115 and a line segment drawn from the fourth point $P_4$ in parallel to the y-axis.

In addition, the first circular locus 111 has the locus center axis 111a like in FIG. 10. A sixth point $P_6$ is given by drawing a perpendicular from the first point $P_1$ to the locus center axis 111a. A seventh point $P_7$ is determined by a point of intersection between the line segment $P_1$-$P_5$ and the line segment $P_1$-$P_6$. Like in FIG. 25, the crossed axis angle is represented by g.

In FIG. 27, the coordinate system illustrated in FIG. 26 is seen from the z-axis on a plane determined by the circular orbit 115 having a radius rg. In the example being illustrated, the third and the seventh points $P_3$ and $P_7$ are connected by a line segment.

It is readily understood that the line segment $P_4$-$P_2$ is perpendicular to the line segment $P_4$-$P_5$. In addition, the line segment $P_4$-$P_2$ is parallel to the line segment $P_7$-$P_3$. Under the circumstances, the angle $\phi$ between the line segments $P_4$-$P_2$ and $P_4$-$P_3$ is equal to angle between the line segments $P_4$-$P_3$ and $P_3$-$P_7$. Therefore, the common angle $\phi$ is given by:

$$\phi = \sin^{-1}(rx/rg), \quad (1)$$

where rx represents a length of a line segment $P_4$-$P_7$.

As understood from FIG. 26, a distance between the origin P and the first point $P_1$ is equal to that between the origin P and the second point $P_2$ and is represented by R. In this case, the radius rg of the circular orbit 115 is represented by:

$$rg = R\sin(g). \tag{2}$$

In FIG. 28, the coordinate system illustrated in FIG. 26 is seen from the y-axis on a y-z plane. First and second triangles are formed by $P\text{-}P_1\text{-}P_5$ and $P\text{-}P_4\text{-}P_5$, respectively. In as much as the fifth point $P_5$ is positioned in the circular orbit 115 along the spherical surface, the line segment $P\text{-}P_5$ is equal in length to the line segment $P\text{-}P_1$ and is therefore represented by R.

When an oblique angle between the second axle 87 and the second plate member 90 is equal to $\alpha$ as illustrated in FIG. 7, an angle between the line segments $P\text{-}P_1$ and $P\text{-}P_6$ becomes equal to $(90° - \alpha)$.

Under the circumstances, the length rx of the line segment $P_4\text{-}P_7$ is given by:

$$rx = (R - R\cos(g))/\tan(90° - \alpha). \tag{3}$$

Substitution of Equations (2) and (3) into Equation (1) results in:

$$\phi = \sin^{-1}((1 - \cos(g))/\sin(g)\cdot\tan(90° - \alpha)). \tag{4}$$

Thus, the common angle $\phi$ can be calculated from the crossed axis angle g and the oblique angle $\alpha$. In other words, the center point of the free end moves from the first point $P_1$ to the second point $P_2$ when the first and the second axles 81 and 87 are rotated by $-\phi$ and $\phi$, respectively. Therefore, the first and the second angles $M_1$ and $M_2$ of rotation are equal to $-\phi$ and $\phi$, respectively.

Let the first and the second axles 81 and 87 be rotated in the same direction by the same azimuth which will be indicated at b. For example, the center point is assumed to be rotated about the z-axis by the azimuth b from the second point $P_2$ illustrated in FIG. 26. In this event, each of the first and the second axles 81 and 87 may be rotated by an angle equal to the azimuth b. Accordingly, the first and the second angles $M_1$ and $M_2$ of rotation are given by:

$$M_1 = -\phi + b$$

and $$M_2 = \phi + b. \tag{5}$$

From Equations (4) and (5), it is understood that the center point of the free end can be moved to a desired position within a range determined with reference to the common angle $\phi$ and the oblique angle $\alpha$.

Referring back to FIG. 23, the illustrated control circuit 165 is for use in calculating the first and the second angles $M_1$ and $M_2$ of rotation in response to the crossed axis angle g and the azimuth b both of which are given in the form of electric signals and which are indicative of the desired position to which the center point of the free end is to be moved.

The control circuit 165 comprises a first calculation circuit 171 responsive to the crossed axis angle g for calculating the common angle $\phi$ in accordance with Equation (4) and a second calculation circuit 172 responsive to the common angle $\phi$ and the azimuth b for calculating the first and the second angles $M_1$ and $M_2$ in accordance with Equation (5).

More specifically, the first calculation circuit 171 comprises first and second calculators 176 and 177 responsive to the crossed axis angle g for calculating a first term of $\sin(g)$ and a second term of $(1 - \cos(g))$ in Equation (4), respectively. A third calculator 178 calculates a third term of $\tan(90° - \alpha)$ with reference to the oblique angle $\alpha$. Responsive to the first and the third terms, a multiplier 179 calculates a product of $\sin(g)$ and $\tan(90° - \alpha)$ which is representative of a denominator of Equation (4). The second term of $(1 - \cos(g))$ is divided by the denominator in a divider 181. A result of division is sent to a fourth calculator 182 to carry out arcsine transformation and to calculate the common angle $\phi$.

The second calculation circuit 172 comprises a subtractor 183 for subtracting the common angle $\phi$ from the azimuth b to calculate the first angle $M_1$ and an adder 184 for adding the common angle $\phi$ to the azimuth b to calculate the second angle $M_2$.

All of the elements included in the first and the second calculation circuits 171 and 172 can be readily constituted by usual circuits. Equations (4) and (5) may also be carried out by a program executed in a microprocessor.

Figure 29:
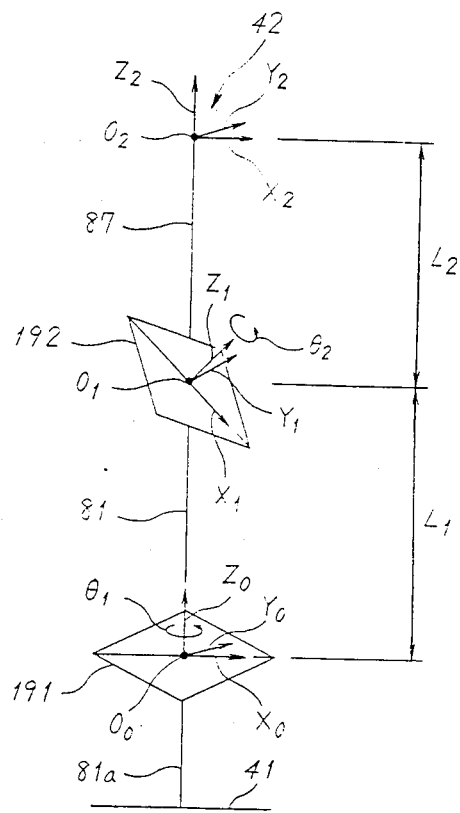
FIG. 29 is a diagrammatical view of each joint assembly for use in describing a joint system according to an eighth embodiment of this invention.
Figure 30:
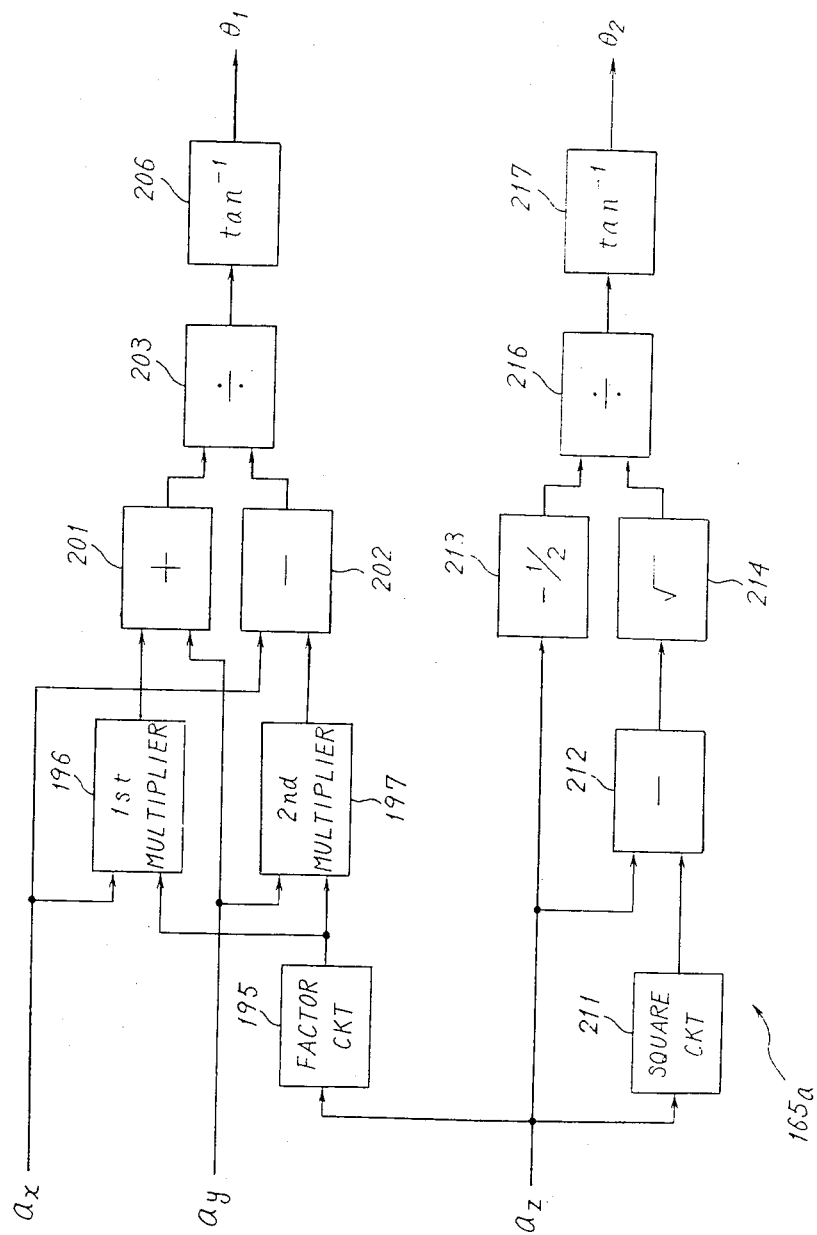
FIG. 30 is a block diagram of a control circuit for use in the joint system according to the eighth embodiment of this invention.

Referring to FIGS. 29 and 30, a joint system according to an eighth embodiment of this invention comprises each joint assembly illustrated in conjunction with the first through sixth embodiments and a control circuit 165a illustrated in FIG. 30. The joint mechanism can diagrammatically be shown in FIG. 29 and is specified by a combination of a first joint portion 191 and a second joint portion 192 which correspond, for example, to the first axle end of the first axle 81 supported by the first motor 96 and to an oblique plate portion, such as the first and the second plate members 84 and 90, respectively. In the illustrated joint assembly, let a reference coordinate system be defined by an orthogonal coordinate system of X, Y, and Z axes, with the first and the second joint assemblies 191 and 192 kept inactive.

The first joint portion 191 is coupled to the reference end 41 and rotatable about the first axis 81a. The first joint portion 191 defines a first origin $O_0$ and a first coordinate system of $X_0\text{-}Y_0\text{-}Z_0$ determined with respect to the first origin $O_0$ and rotatable about the $Z_0$ axis. The $Z_0$ axis of the first coordinate system is extended along the first axis 81a while the $X_0$ and $Y_0$ axes are orthogonal to each other and directed to predetermined directions, respectively. The first coordinate system is coincident with the reference coordinate system of X-Y-Z when the first coordinate system is not rotated.

The first joint portion 191 is coupled to the second joint portion 192 through the first axle 81 having a length $L_1$.

The second joint portion 192 defines a second origin $O_1$ and a second coordinate system of $X_1\text{-}Y_1\text{-}Z_1$ determined with respect to the second origin $O_1$. The second origin $O_1$ is determined on the $Z_0$ axis rotatable about the first axis 81a. It is assumed that the first and the second coordinate systems are rotated about the $Z_0$ and the $Z_1$ axes by first and second angles of rotation, respectively.

The second coordinate system is defined on the axis end plane described in conjunction with FIG. 7 and has the $Z_1$ axis perpendicular to the axis end plane and the $X_1$ and $Y_1$ axes orthogonal to the $Z_1$ axis and to each other. The axis end plane is assumed to be oblique to the first axle 81 at a first joint angle $\alpha_1$.

As illustrated in FIG. 8, the second axle 87 is coupled to the second joint portion 192 and is oblique to the axis end surface at a second joint angle $\alpha_2$ equal to $(-\alpha_1)$, as readily understood from FIG. 7. The second axle 87 has a second length $L_2$ and the fourth end coupled to the free end 42.

A third coordinate system are defined with respect to the center point or third origin $O_2$ on the free end 42 and is specified by $X_2$, $Y_2$, and $Z_2$ axes.

It is assumed that the first and the third coordinate systems are initially coincident with the reference coordinate system. A reference position of the $Z_1$ axis is determined on a plane defined by X and Z axes of the reference coordinate system when the first axle 81 is aligned with the second axle 87. In this case, the $Z_1$ axis is aligned with the $Z_0$ and $Z_2$ axes on the X-Z plane.

More particularly, when the first through third coordinate systems are represented by $X_i$, $Y_i$, and $Z_i$ ($i = 0 \sim 2$), each axis of $Y_i$ is placed so that it is coincident with the Y axis of the reference coordinate system. Under the circumstances, each axis of $X_i$ is selected such that:

$$X_i = (Y_i \times Z_i)/|Y_i \times Z_i|.$$

Let each angle of rotation of an i-th joint portion be represented by $\theta_{i+1}$. In this event, it is possible to calculate a transformation matrix $T_i$ for making one of the coordinate systems $(X_{i-1}-Y_{i-1}-Z_{i-1})$ coincide with another one $(X_i-Y_i-Z_i)$. More specifically, transformation is carried out in the first axle 81 to make the first coordinate system of $X_0$-$Y_0$-$Z_0$ coincide with the second with the second coordinate system of $X_1$-$Y_1$-$Z_1$ and is given by first, second, and third operations specified by:

$$\text{rot}(Z_0, \theta_1),$$

$$\text{trans}(L_1, Z_0),$$

and $$\text{rot}(Y_0, \alpha_1), \tag{6}$$

where rot is representative of rotation and trans is representative of translation, as known in the art.

It is possible to carry out the first through third operations of the formulae (6) by the use of a first translation matrix $T_1$ given by:

$$T_1 = \begin{bmatrix} \cos\theta_1 & -\sin\theta_1 & 0 & 0 \\ \sin\theta_1 & \cos\theta_1 & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & L_1 \\ 0 & 0 & 0 & 1 \end{bmatrix} \begin{bmatrix} \cos\alpha_1 & 0 & \sin\alpha_1 & 0 \\ 0 & 1 & 0 & 0 \\ -\sin\alpha_1 & 0 & \cos\alpha_1 & 0 \\ 0 & 0 & 0 & 1 \end{bmatrix} \tag{7}$$

$$= \begin{bmatrix} \cos\alpha_1\cos\theta_1 & -\sin\theta_1 & \sin\alpha_1\cos\theta_1 & 0 \\ \cos\alpha_1\sin\theta_1 & \cos\theta_1 & \sin\alpha_1\sin\theta_1 & 0 \\ -\sin\alpha_1 & 0 & \cos\alpha_1 & L_1 \\ 0 & 0 & 0 & 1 \end{bmatrix}.$$

In order to make the second coordinate system of $X_1$-$Y_1$-$Z_1$ coincide with the third coordinate system of $X_2$-$Y_2$-$Z_2$ through the second axle 87, it is necessary to carry out the following transformation given by:

$$\text{rot}(Z_1, \theta_1),$$

$$\text{rot}(Y_1, \alpha_2),$$

and $$\text{trans}(L_2, Z_1). \tag{8}$$

Like the first transformation matrix $T_1$, a second transformation matrix $T_2$ is given from the formulae (8) by:

$$T_2 = \begin{bmatrix} \cos\theta_2 & -\sin\theta_2 & 0 & 0 \\ \sin\theta_2 & \cos\theta_2 & 0 & 0 \\ 0 & 0 & 1 & 0 \\ 0 & 0 & 0 & 1 \end{bmatrix} \begin{bmatrix} \cos\alpha_2 & 0 & \sin\alpha_2 & 0 \\ 0 & 1 & 0 & 0 \\ -\sin\alpha_2 & 0 & \cos\alpha_2 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & L_2 \\ 0 & 0 & 0 & 1 \end{bmatrix} \tag{9}$$

$$= \begin{bmatrix} \cos\alpha_2\cos\theta_2 & -\sin\theta_2 & +\sin\alpha_2\cos\theta_2 & L_2\sin\alpha_2\cos\theta_2 \\ \cos\alpha_2\sin\theta_2 & \cos\theta_2 & \sin\alpha_2\sin\theta_2 & L_2\sin\alpha_2\sin\theta_2 \\ -\sin\alpha_2 & 0 & \cos\alpha_2 & L_2\cos\alpha_2 \\ 0 & 0 & 0 & 1 \end{bmatrix}.$$

An overall transformation matrix T of the joint mechanism is given by:

$$T = T_1 \cdot T_2$$

In as much as the first joint angle $\alpha_1$ is equal to $(-\alpha_2)$, as mentioned before, a joint angle $\alpha$ may be substituted for $\alpha_1$ and $-\alpha_2$. In this event, the overall transformation matrix T is rewritten into:

$$T = \begin{bmatrix} C_1(S_\alpha^2 + C_\alpha^2 C_2) - C_\alpha S_1 S_2 & -C_\alpha C_1 S_2 - C_2 S_1 \\ S_1(S_\alpha^2 + C_\alpha^2 C_2) + C_\alpha C_1 S_2 & -C_\alpha S_1 S_2 + C_1 C_2 \\ C_\alpha S_\alpha(1 - C_2) & S_\alpha S_2 \\ 0 & 0 \end{bmatrix} \tag{10}$$

$$\begin{bmatrix} S_\alpha(C_\alpha C_1(1 - C_2) + S_1 S_2) & L_2 S_\alpha(C_\alpha C_1(1 - C_2) + S_1 S_2) \\ S_\alpha(C_\alpha S_1(1 - C_2) - C_1 S_2) & L_2 S_\alpha(C_\alpha S_1(1 - C_2) - C_1 S_2) \\ S_\alpha^2 C_2 + C_\alpha^2 & L_1 + L_2(S_\alpha^2 C_2 + C_\alpha^2) \\ 0 & 1 \end{bmatrix},$$

where $C_1$, $C_2$, and $C_\alpha$ represent $\cos\theta_1$, $\cos\theta_2$, and $\cos\alpha$, respectively, and $S_1$, $S_2$, and $S_\alpha$ represent $\sin\theta_1$, $\sin\theta_2$, and $\sin\alpha$, respectively.

For simplicity of Equation (10), let the joint angle $\alpha$ be equal to 45. In this event, the overall transformation matrix indicated at $T_{45}$ is given by:

$$T_{45} = \begin{bmatrix} (\tfrac{1}{2})(C_1(1 + C_2) - \sqrt{2} S_1 S_2) & -C_2 S_1 - (1/\sqrt{2})C_1 S_2 \\ (\tfrac{1}{2})(S_1(1 + C_2) + \sqrt{2} C_1 S_2) & C_1 C_2 - (1/\sqrt{2})S_1 S_2 \\ (\tfrac{1}{2})(1 - C_2) & S_2/\sqrt{2} \\ 0 & 0 \end{bmatrix} \tag{11}$$

$$\begin{bmatrix} (\tfrac{1}{2})(C_1(1 - C_2) + \sqrt{2} S_1 S_2) & (L_2/2)(C_1(1 - C_2) + \sqrt{2} S_1 S_2) \\ (\tfrac{1}{2})(S_1(1 - C_2) - \sqrt{2} C_1 S_2) & (L_2/2)(S_1(1 - C_2) - \sqrt{2} C_1 S_2) \\ (\tfrac{1}{2})(1 + C_2) & L_1 + (L_2/2)(1 + C_2) \\ 0 & 1 \end{bmatrix}.$$

From Equation (11), it is possible to determine a position or coordinate P and a sense a of the center point $\theta_2$ of the free end, if the first and the second angles $\theta_1$ and $\theta_2$ of rotation is determined. Thus, the position P and the sense a are represented by vector representation and will be referred to as a position vector and an approach vector, respectively. Specifically, the position P is specified by Px, Py, and Pz which are coordinate components along $X_1$, $Y_1$, and $Z_1$ axes, respectively, and which are given by:

$$Px = (L_2/2)(C_1(1 - C_2) + \sqrt{2}\ S_1S_2), \quad (12)$$

$$Py = (L_2/2)(S_1(1 - C_2) - \sqrt{2}\ C_1S_2), \text{ and}$$

$$Pz = L_1 + (L_2/2)(1 + C_2).$$

Likewise, the sense a is specified by x, y, and z components $a_x$, $a_y$, and $a_z$ which are given along $X_1$, $Y_1$, and $Z_1$ axes, respectively, and which are represented by:

$$a_x = (\tfrac{1}{2})(C_1(1 - C_2) + \sqrt{2}\ S_1S_2), \quad (13\text{-}1)$$

$$a_y = (\tfrac{1}{2})(S_1(1 - C_2) - \sqrt{2}\ C_1S_2), \text{ and} \quad (13\text{-}2)$$

$$a_z = (\tfrac{1}{2})(1 + C_2). \quad (13\text{-}3)$$

Figure 31:
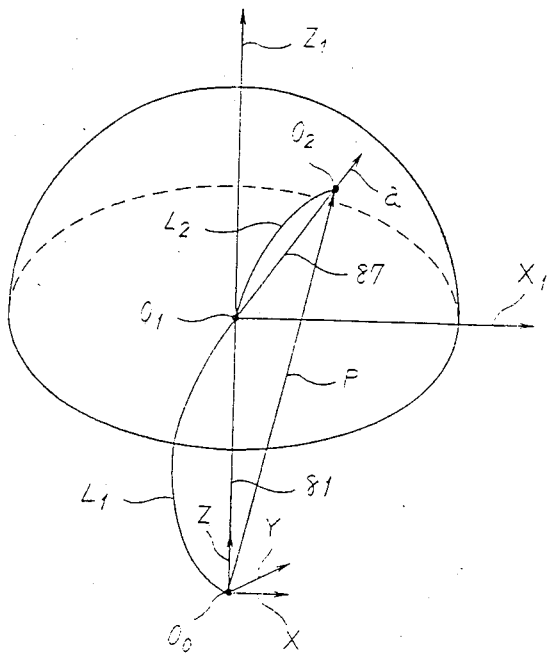
FIG. 31 is a view for use in describing operation of the joint system controlled by the control circuit illustrated in FIG. 30.

In FIG. 31, the position and the approach vectors P and a are illustrated with respect to the reference coordinate system of X-Y-Z which has an origin coincident with the origin $0_0$ of the first coordinate system of $X_0$-$Y_0$-$Z_0$. As shown in FIG. 31, the center point $O_2$ of the free end is placed at a position represented by the position vector P of Equation (12). The center point $O_2$ is moved in a sense represented by the approach vector a of Equations (13-1) to (13-3).

Let each component ($a_x$, $a_y$, $a_z$) of the approach vector a be indicated in the reference coordinate system. Since $a_x^2 + a_y^2 + a_z^2 = 1$, two of the components are independent components. Taking the above into consideration, the second angle $\theta_2$ of rotation can be calculated in the following manner. From Equation (13-3), cosine $\theta_2$ is given by:

$$C_2 = 2a_z - 1. \quad (14)$$

Since $C_2^2 + S_2^2 = 1$, $\sin\theta_2$ is represented by:

$$S_2 = \pm \sqrt{1 - C_2^2} \quad (15)$$

$$= 2 \pm \sqrt{a_z(1 - a_z)}\ .$$

From Equations (14) and (15), $\theta_2$ is given by:

$$\theta_2 = \tan^{-1}(S_2/C_2) = \tan^{-1}(\pm \sqrt{a_z(1 - a_z)}\ /(a_z - \tfrac{1}{2})). \quad (16)$$

Substitution of Equations (14) and (15) into Equations (13-1) and (13-2) gives:

$$a_x = (1 - a_z)C_1 \pm \sqrt{2a_z(1 - a_z)}\cdot S_1, \text{ and} \quad (17)$$

$$a_y = (1 - a_z)S_1 \pm \sqrt{2a_z(1 - a_z)}\cdot C_1.$$

From Equation (17), a relationship between $\sin\theta_1$ and $\cos\theta_1$ is given by:

$$(S_1/C_1) = (\pm \sqrt{2a_z/(1 - a_z)}\cdot a_x + a_y) \div \quad (18)$$

$$(a_x \pm \sqrt{2a_z/(1 - a_z)}\cdot a_y).$$

Accordingly, the first angle $\theta_1$ is represented by:

$$\theta_1 = \tan^{-1}(S_1/C_1) \quad (19)$$

$$= \tan^{-1}(Ka_x + a_y)/(a_x - Ka_y),$$

where K is representative of $$\pm \sqrt{2a_z/(1 - a_z)}\ . \quad (20)$$

As mentioned above, it is possible to calculate the first and the second angles $\theta_1$ and $\theta_2$ when the components $a_x$, $a_y$, and $a_z$ are indicated in the orghogonal coordinate system.

In FIG. 30, the control circuit 165a calculates the first and the second angles $\theta_1$ and $\theta_2$ in response to the components $a_x$, $a_y$, and $a_z$ of the approach vector a in accordance with Equations (16) and (19). To this end, the control circuit 165a comprises a factor circuit responsive to the component $a_z$ for calculating a factor K in accordance with Equation (20). The factor K is multiplied by the components $a_x$ and $a_y$ in first and second multipliers 196 and 197 to produce first and second products representative of $Ka_x$ and $Ka_y$, respectively. An adder 201 adds the first product $Ka_x$ to the component $a_y$ to calculate a sum of them while a subtractor 202 subtracts the second product from the component $a_x$ to calculate a difference therebetween. A divider 203 divides the sum by the difference to supply a result of division to a first arctangent transformer 206. Thus, the first angle $\theta_1$ of rotation is calculated in accordance with Equation (19).

On the other hand, the component $a_z$ is supplied to a square circuit 211 for calculating a square of the component $a_z$ and an additional subtractor 212 for subtracting the component $a_z$ from the square thereof to produce an additional difference therebetween. In addition, a subsidiary subtractor 21 subtracts a subsidiary factor equal to $(-\tfrac{1}{2})$ from the component $a_z$ to produce a subsidiary difference therebetween. A square root of the additional difference is calculated by a root circuit 214 and is sent to an additional divider 216.

The additional divider 216 divides the square root of the additional difference by the subsidiary difference calculated by the subsidiary subtractor 213 to produce an additional result of division. The additional result of division is sent to a second arctangent transformer 217 to be transformed into the second angle $\theta_2$ of rotation.

Figure 32:
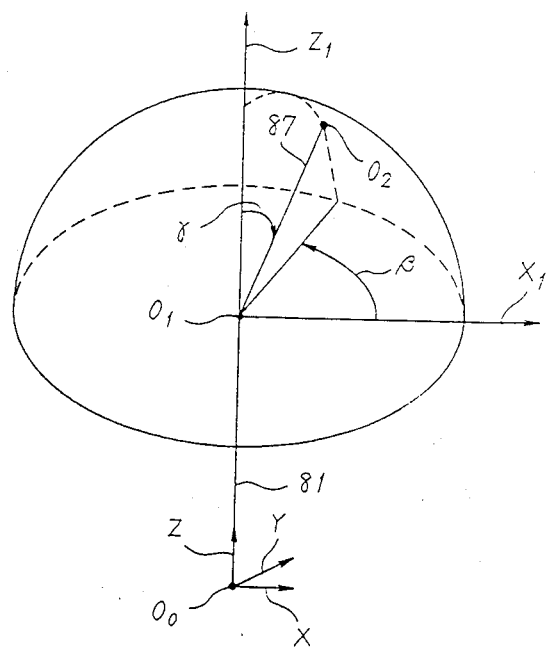
FIG. 32 is a view for use in describing a joint system according to a ninth embodiment of this invention.
Figure 33:
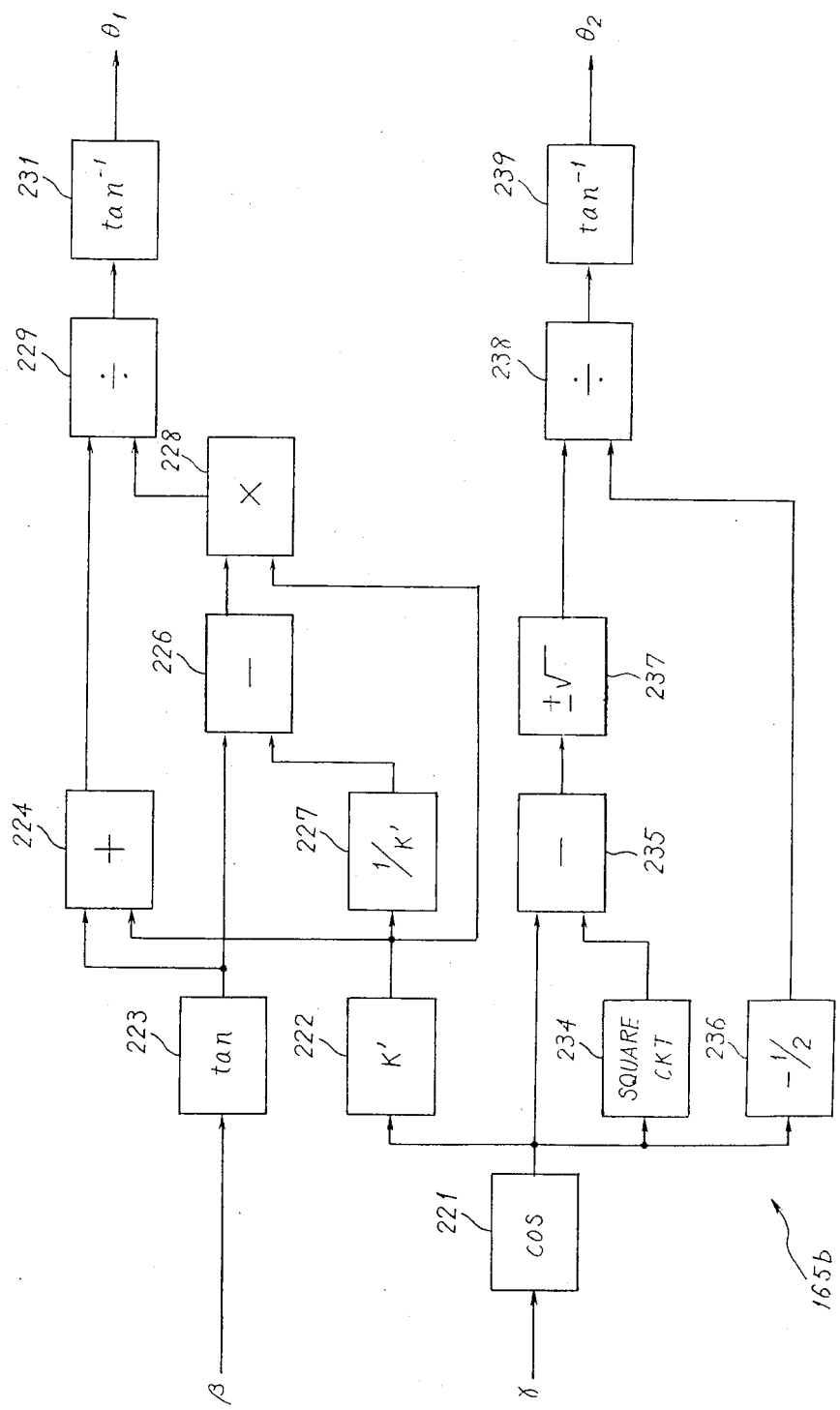
FIG. 33 is a block diagram of a control circuit for use in the joint system described in conjunction with FIG. 32.

Referring to FIGS. 32 and 33, a joint assembly according to a ninth embodiment of this invention is for use in calculating the first and the second angles $\theta_1$ and $\theta_2$ of rotation by the use of an azimuth $\beta$ and a crossed axis angle $\alpha$ of the approach vector a. In FIG. 32, the azimuth $\beta$ is defined with respect to the $X_1$ axis while the crossed axis angle $\gamma$ is defined with respect to the $Z_1$ axis. The components $a_x$, $a_y$, and $a_z$ of the approach vector a can be represented by the use of the azimuth $\beta$ and the crossed axis angle $\gamma$ as follows.

$$a_x = \cos\beta\cdot\sin\gamma, \quad (21\text{-}1)$$

$$a_y = \sin\beta\cdot\sin\gamma, \quad (21\text{-}2)$$

and $$a_z = \cos\gamma. \tag{21-3}$$

Substitution of Equation (21-3) into Equation (16) results in:

$$\theta_2 = \tan^{-1}(\pm \sqrt{(\cos\gamma(1 - \cos\gamma)/(\cos\gamma - \tfrac{1}{2}))}. \tag{22}$$

Substitution of Equations (21-1) through (21-3) into Equation (19) gives:

$$\theta_1 = \tan^{-1}(K'\cos\beta + \sin\beta)/(\cos\beta - K'\sin\beta) \tag{23}$$

$$= \tan^{-1}(K' + \tan\beta)/(1 - K'\tan\beta),$$

where K' represents $$\pm \sqrt{2\cos\gamma/(1 - \cos\gamma)}. \tag{24}$$

Thus, the first and the second angles $\theta_1$ and $\theta_2$ can be calculated in accordance with Equations (23) and (22), respectively. In FIG. 33, a control circuit 165b is supplied with a specific azimuth $\beta$ and a specific crossed axis angle $\gamma$ represented by polar representation. The specific crossed axis angle $\gamma$ is sent to a cosine circuit 221 for calculating $\cos\gamma$ as a cosine term. The cosine term is delivered to a factor circuit 222 for calculating a factor K'.

On the other hand, the specific azimuth $\beta$ is sent through a tangent circuit 223 to an adder circuit 224 and a first subtractor 226 in the form of $\tan\beta$ which will be called a tangent term. The adder circuit 224 adds the tangent term to the factor K' to a sum of them. Responsive to the factor K', a reciprocal circuit 227 calculates a reciprocal (1/K') of the factor K' to supply the reciprocal (1/K') to the subtractor 226. The first subtractor 226 subtracts the tangent term ($\tan\beta$) from the reciprocal (1/K') to produce a first difference therebetween.

A multiplier 228 multiplies the first difference by the factor K' to deliver a product to a first divider 229 which is supplied with the sum representative of (K'+$\tan\beta$). The first divider 229 divides the sum by the product representative of (1−K'$\tan\beta$) to produce a first result of division. The first result of division is transformed by a first arctangent circuit 231 into the first angle $\theta_1$ of rotation.

The cosine term ($\cos\gamma$) is delivered to a square circuit 234, a second subtractor 235, and a subsidiary subtractor (−$\tfrac{1}{2}$) 236. The square circuit 234 calculates a square of the cosine term which is sent to the second subtractor 236. The second subtractor 235 subtracts the cosine term from the square thereof to produce a second difference therebetween. A square root of the second difference is calculated by a square root circuit 237 and is sent to a second divider 238.

The subsidiary subtractor 236 subtracts a factor of (−$\tfrac{1}{2}$) from the cosine term to supply a result of subtraction to the second divider 238. The second divider 238 divides the square root by the result of subtraction to produce a second result of division. The second result of division is transformed by a second arctangent circuit 239 into the second angle $\theta_2$ of rotation.

Thus, it is possible to calculate the first and the second angles $\theta_1$ and $\theta_2$ from the approach vector. If the first and the second joint portions 191 and 192 are driven by the first and the second angles $\theta_1$ and $\theta_2$, respectively, the second axle 87 can be moved in accordance with the approach vector a.

While this invention has thus far been described in conjunction with about ten embodiments thereof, it will readily be possible for those skilled in the art to put this invention into practice in various other manners. For example, the joint assembly may be controlled by a microcomputer or by a method of looking up an ROM. A plurality of the joint assemblies may be connected in series. In FIGS. 8, 9, and 18 through 22, a combination of the parallel bars and the side bars may be a circular ring.

What is claimed is:

1. A joint assembly for joining a reference end to a free end to move said free end relative to said reference end, said joint assembly comprising:
   a first axle member having a first axis, a first axis end rotatably supported on said reference end, and a second axis end, defining an axis end plane oblique to said first axis at a predetermined angle;
   a second axle member having a second axis concurrent with said first axis, a third axis end rotatably guided along said axis end plane, and a fourth axis end adjacent to said free end; and
   coupling means for coupling said fourth axis end to said reference end and said free end to move said free end in cooperation with said first and said second axle members.

2. A joint assembly as claimed in claim 1, wherein said first axle member comprises:
   a first axle having said first axis, said first axis end, a first additional axis end opposite to said first axis end; and
   a first end plate fixed to said first additional axis end and oblique to said first axis at said predetermined angle to provide said second axis end and said axis end plane at said second axis end;
   said second axle member comprising:
   a second axle having said second axis, said fourth axis end, and a second additional axis end opposite to said fourth axis end;
   a second end plate fixed to said second additional axis end to provide said third axis end; and
   joining means for joining said second end plate to said first end plate so that said second end plate is kept in parallel to said first end plate and is rotatable about said second axis on said axis end plane.

3. A joint assembly as claimed in claim 2, wherein said coupling means comprises:
   joint means affixed to said reference plane and coupled to said free end and said fourth axis end for moving said free end in cooperation with said second axle member by restricting rotation of said free end restricted around said second axis.

4. A joint assembly as claimed in claim 1, wherein said axle member comprises:
   a first shell having said first axis, said first axis end, and said second axis end oblique to said first axis, said second axis end defining said axis end plane;
   said second axle member comprising:
   a second shell having said second axis, said third axis end rotatably guided along said second axis end, and said fourth axis end associated with said free end to provide a space within said first and said second shells;
   said coupling means comprising:

joint means placed in said space for joining said reference end to said fourth axis end to move said free end with respect to said reference end.

5. A joint assembly as claimed in claim 4, further comprising:
   first rotation means having said reference end and coupled to said joint means for rotating said joint means around said first axis within said space to move said second shell and said free end; and
   second rotating means coupled to said first shell for rotating said first shell around said first axis.

6. A joint assembly as claimed in claim 1, wherein said first axle member comprises:
   a first axle having said first axis, said first axis end, and a first additional axis end opposite to said first axis end;
   a housing fixed to said first additional axis end for providing said second axis end and said axis end plane oblique to said first axis with a housing space left therein;
   said second axle member comprising:
   a second axle having said second axis, said fourth axis end, and a second additional axis end adjacent to said first additional axis end;
   an arm element coupled to said second additional axis end; and
   a rotatable member housed in said housing space and having an axis of rotation for providing said third axis end within said housing space, said axis of rotation intersecting said first and said second axes.

7. A joint assembly as claimed in claim 1, said joint assembly being movable with respect to a reference attitude and comprising:
   detecting means coupled to each of said first and said second axle members for detecting said reference attitude.

8. A joint system for use in combination with the joint assembly of claim 1, said free end being movable within a predetermined coordinate system defined with respect to a point of intersection between said first and said second axes and being placed at a position specified by an azimuth and a crossed axis angle between said first and said second axes in said predetermined coordinate system, said joint system comprising:
   calculating means responsive to said azimuth and said crossed axis angle for calculating a first and a second angle of rotation of said first and said second axes which are necessary for moving said free end to said position.

9. A joint system as claimed in claim 8, the motion of said free end being specifiable by said azimuth and a common angle component which is common to said first and said second angles of rotation and derived from said crossed angle, wherein said calculating means comprises:
   first means responsive to said crossed axis angle for calculating said common angle component;
   second means coupled to said first means and responsive to said azimuth for adding said common angle component to said azimuth to produce said first angle of rotation; and
   third means coupled to said first means and responsive to said azimuth for subtracting said common angle component from said azimuth to produce said second angle of rotation.

10. A joint system for use in combination with the joint assembly of claim 1, said reference end and said axis end plane having a first coordinate system rotatable about a first axis of rotation identical with said first axis and a second coordinate system rotatable about a second axis of rotation perpendicular to said axis end plane, said free end being moved to a position, said joint system comprising:
    calculation means responsive to a preselected vector quantity for calculating a first and a second angle of rotation about said first and said second axes of rotation to move said position in accordance with said first and said second angles.

11. A joint system as claimed in claim 10, wherein said preselected vector quantity is a sense of motion of said free end.

* * * * *